(12) United States Patent
Kluge et al.

(10) Patent No.: US 11,644,343 B2
(45) Date of Patent: May 9, 2023

(54) FLUX COUPLING SENSOR

(71) Applicant: MELEXIS TECHNOLOGIES SA, Bevaix (CH)

(72) Inventors: Wolfram Kluge, Bevaix (CH); David Ihle, Bevaix (CH); Jorg Rudiger, Bevaix (CH); Sascha Beyer, Bevaix (CH)

(73) Assignee: Melexis Technologies SA, Bevaix (CH)

( * ) Notice: Subject to any disclaimer, the term of this patent is extended or adjusted under 35 U.S.C. 154(b) by 189 days.

(21) Appl. No.: 16/963,287

(22) PCT Filed: Jan. 22, 2019

(86) PCT No.: PCT/EP2019/051415
§ 371 (c)(1),
(2) Date: Jul. 20, 2020

(87) PCT Pub. No.: WO2019/141854
PCT Pub. Date: Jul. 25, 2019

(65) Prior Publication Data
US 2021/0048316 A1 Feb. 18, 2021

(30) Foreign Application Priority Data
Jan. 22, 2018 (EP) ..................... 18152825

(51) Int. Cl.
*G01D 5/20* (2006.01)
*G01D 5/22* (2006.01)

(52) U.S. Cl.
CPC ......... *G01D 5/2053* (2013.01); *G01D 5/2225* (2013.01)

(58) Field of Classification Search
CPC ...... G01D 5/202; G01D 5/204; G01D 5/2053; G01D 5/2225; G01D 5/2275;
(Continued)

(56) References Cited

U.S. PATENT DOCUMENTS 6,043,644 A * 3/2000 de Coulon ........... G01D 5/2208
324/164
6,166,535 A 12/2000 Irle et al.
(Continued)

FOREIGN PATENT DOCUMENTS

DE 202008013715 U1 1/2009
EP 1164358 A1 12/2001
EP 0901002 B1 1/2002

OTHER PUBLICATIONS

Office Action from corresponding European Application No. EP18152825.8, dated Dec. 16, 2020.
(Continued)

*Primary Examiner* — Steven L Yeninas
(74) *Attorney, Agent, or Firm* — Workman Nydegger PC

(57) ABSTRACT

An apparatus for sensing a position of a target, in particular for offset invariant sensing of the position of the target, is described as well as a corresponding method. The apparatus comprises at least three sensor elements. At least one sensor element of the at least three sensor elements generates a first magnetic field. At least two sensor elements of the at least three sensor elements receive a second magnetic field associated with the first magnetic field. The at least two sensor elements of the at least three sensor elements form at least one sensor element pair and provide a signal indicative of the position of the target.

18 Claims, 9 Drawing Sheets

(58) Field of Classification Search
CPC .... G01D 5/2046; G01D 5/2073; G01D 5/208; G01R 33/0017; H02K 11/225; G01B 7/003; G01B 7/023; G01B 7/30; G01P 3/488; H05K 1/165; H01F 5/003
See application file for complete search history.

(56) References Cited

U.S. PATENT DOCUMENTS

| | | | |
|---|---|---|---|
| 6,255,810 B1* | 7/2001 | Irie | G01D 5/204 |
| | | | 324/207.17 |
| 6,304,076 B1 | 10/2001 | Madni et al. | |
| 6,611,138 B2 | 8/2003 | Vasiloiu | |
| 9,255,818 B2* | 2/2016 | Bergqvist | G01D 5/225 |
| 10,371,849 B2* | 8/2019 | Miyamoto | G01V 3/10 |
| 2002/0005726 A1* | 1/2002 | Miyata | G01D 5/204 |
| | | | 324/662 |
| 2002/0011839 A1* | 1/2002 | Miyata | H01F 5/003 |
| | | | 324/207.17 |
| 2002/0017902 A1 | 2/2002 | Vasiloiu | |
| 2003/0067293 A1 | 4/2003 | Golder et al. | |
| 2006/0225358 A1* | 10/2006 | Haag | H02K 11/215 |
| | | | 49/360 |
| 2011/0181302 A1 | 7/2011 | Shao et al. | |
| 2015/0323348 A1 | 11/2015 | Liu et al. | |
| 2018/0120083 A1* | 5/2018 | Reddy | G01B 7/30 |

OTHER PUBLICATIONS

International Search Report and Written Opinion from PCT Application No. PCT/EP2019/051415, dated Mar. 27, 2019.
Extended European Search Report from corresponding EP Application No. 18152825.8, dated Jun. 20, 2018.

\* cited by examiner

FLUX COUPLING SENSOR

TECHNICAL FIELD

The current application concerns an apparatus for sensing a position of a target, in particular for offset invariant sensing of the position of the target, by ease of magnetic flux coupling.

BACKGROUND

Apparatuses for measuring a magnetic field property of a magnetic field are often referred to as magnetic field sensors or magnetic sensors. These kinds of sensors have a broad field of use. Often, these kinds of sensors are used in combination with magnetized objects or objects which influence a magnetic field in one way or another. Thereby, the magnetic sensors measure at least one property of the magnetic field either emanated by the object, i.e. originating from the object itself, or influenced by the object. Based on the measured at least one magnetic field property the position of the object is determined, thereby more than one measured at least one magnetic field property may be combined or processed to determine the position of the object. Therefore, these sensors are also often called position sensors. The most common position sensors are thereby linear and angular position sensors. A linear position sensor determines the position of the object on a linear path relative to the sensor, whereas an angular sensor determines the angular orientation of such an object in the vicinity of the sensor. Furthermore, the sensors are also capable of determine a change in the position of the object, for example a motion of the object on a linear path or its rotation.

The position sensors can either perform direct or indirect measurements of the at least one property of the encountered magnetic field to determine the linear and/or angular position of the object. The measured property of the magnetic field allows to quantify the magnetic field, for example in terms of the magnetic field strength, its direction or the magnetic flux etc. and as such allows a determination of the position of the object, which either emanates the magnetic field or affects the magnetic field. For a direct measurement, for example, the magnetic field strength of the magnetic field encountered can be measured, whereas for an indirect measurement the magnetic flux can be measured by measuring a quantifiable property induced by the magnetic flux, for example an induced current or voltage.

Position sensors using direct measurements often times employ Hall elements, in order to measure the magnetic field strength of the encountered magnetic field and then determine the angular and/or linear position of the object based on the measured magnetic field strength.

Position sensors using indirect measurements often times employ inductive sensor elements, for example coils, in order to measure a property induced by the encountered magnetic field and then determine based on the measured induced property the angular and/or linear position of the object, which in this context is also often referred to as target. These magnetic sensors are also often called inductive magnetic sensors, as for example described in US 2015/0323348 A1 and EP 0 901 002 B1. Thereby, the magnetic field which induces the measured property can either originate from the target, for example by eddy currents induced in the target itself, or can originate from a coil generating a magnetic field, which then couples via the target to at least one receiving coil.

Inductive magnetic sensors are not affected by static disturbing magnetic fields (static stray fields) from surrounding components, devices, apparatuses, or the environment in general. Nevertheless, these inductive magnetic sensors are still sensitive to alternating disturbing magnetic fields (alternating stray fields).

Furthermore, since the inductive magnetic sensors must be capable of being integrated in a small packaging, only a limited area can be used for the sensor elements generating the magnetic field and respectively receiving the magnetic field. While the size of the sensor elements shrink, the tolerances of the target position remain unchanged, i.e. their acceptable displacements relative to the sensor remain unchanged. This means the targets can still have a substantial offset as compared to the size of the area used for the sensor elements. An offset in this context refers to any displacement of the target in relation to the inductive magnetic sensors, which leads to a wrong determination of the position of the target. Thereby, a displacement can refer either to a lateral offset of the target and the inductive magnetic sensor, or to an angular offset of the target and the inductive magnetic sensor. In the known inductive magnetic sensors, for example, the target and the sensor elements must be aligned either to a rotational axis or to a linear path, at least to a certain degree, in order to allow the position to be determined correctly. An offset from the rotational axis or the linear path leads to incorrect position determinations. As such, it can be said that known inductive magnetic sensors are not offset invariant. Hence, they are not robust to target offsets, since even a small offset of the target from the expected rotational axis or the expected linear path lead to wrong magnetic field measurements and in turn to wrong position determinations. This means, if the target's axis of rotation or path of movement is offset either due to mechanical tolerances or mechanical wear, the target position cannot be determined accurately, i.e. the determined position of the target deviates from the real position of the target. These target offsets require as such complex correction algorithms or correcting means, if such corrections are even possible. In any case, such corrections are limited to target offsets, which are small with respect to the dimensions of the sensor.

Hence, one of the objects of the current application is to overcome the disadvantages of the known prior art and to provide an improved position sensor that reduces the influences of alternating magnetic stray fields and that is invariant to target offsets. The offset invariant position determination becomes in particular important when the overall size of the sensor becomes smaller and therefore the offsets may be in the order of magnitude of the size of the sensor, respectively its sensor elements, because then offset corrections are nearly impossible. Thereby, the improved position sensor shall also reduce common mode signal, i.e. enhance the useable signal, and reduce the need for highly rotational invariant targets.

SUMMARY

This object is solved by the apparatus according to the independent claims of the current application.

An apparatus according to the invention may also be referred to as a sensor, a position sensor, a magnetic sensor, a magnetic position sensor, an inductive sensor, or an inductive position sensor.

The sensor according to the invention is for sensing a position of a target relative to the sensor. This position determination is based on measuring of at least one magnetic field property of a magnetic field affected by the target, wherein this affected magnetic field is emanated by the sensor. Thereby, it can be said that the sensor emanates a first magnetic field and receives a second magnetic field. The second magnetic field is thereby the emanated first magnetic field affected by the target. It can also be said that the first and second magnetic field are associated. Thereby, the target may have a shape or form, which affects the first magnetic field in one preferred direction, which is substantially the same for the entire target, and the shape or form may be non-rotational invariant. Hence, if the first magnetic field emanated from the sensor is known, for example being symmetrically, and the target's shape or form has a predefined direction in which it affects this know first magnetic field, the position of the target can be determined based on a measurement of a magnetic field property of the affected magnetic field, hence the second magnetic field, which includes the information of how the first magnetic field was affected. Hence, by measuring the second magnetic field, this information can be extracted and as such the position of the target can be determined. The effect the target's shape or form has got on the emanated first magnetic field is thereby also substantially unitary over the area of the target which faces the sensor. The target may be larger than the area used for the sensor elements generating the first magnetic field and receiving the second magnetic field. The first magnetic field emanated from the sensor may therefore only impinge on a fraction of the area of the target. Since the effect the target's shape or form has got on the emanated first magnetic field is substantially unitary over the area of the target, an offset of the position determination is offset invariant. The position determination may thereby be an angular position and/or a linear position determination. The target may be a moveable object, which rotates or moves in a plane, wherein this plane is spatially separated from a plane defined by one or more elements of the sensor which either emanate the first magnetic field or receive the second magnetic field, respectively measure a magnetic field property of the second magnetic field. The target may move relatively to the sensor, whereby the sensor may have a fixed position. It is however also possible that the target may have a fixed position and the sensor moves relatively to the target. It is also possible that both, the sensor as well as the target move relatively to one another. Thereby, the sensor and/or the target may be mounted to/on moveable parts, for example, moveable parts of a vehicle.

The sensor according to the invention comprises at least three sensor elements, which form elements of the sensor. It shall be understood by a person skilled in the art that even so only three sensor elements are named here, any number of sensor elements equal or greater than three may be implemented. The sensor elements may be magnetic sensor elements like magneto resistive elements or Hall elements, or inductive elements. An inductive element may, for example, be a coil, a wire, a wire in the shape of a coil, a wire in the shape of a spiral, or a wire in the shape of a helix, a loop, a multi turn loop, a solenoid, an inductor, or an array.

At least one of the at least three sensor elements of the sensor according to the invention is configured to generate a first magnetic field. It can also be said that the respective at least one sensor element emanates the first magnetic field. This at least one sensor element may therefore also be referred to as a generating sensor element or a transmitting sensor element. The emanated first magnetic field is thereby a vector field, denoted B, which may comprise the three components $B_x$, $B_y$, and $B_z$ in a three-dimensional Cartesian coordinate system. However, a person skilled in the art will recognize that also other components may be possible, which are only dependent on the definition of the used coordinate system. The at least one transmitting sensor element may generate the first magnetic field as a response to an electric current, which may be applied to the transmitting sensor element. The electric current causes a movement of electromagnetic charges. As known in the art, a movement of electromagnetic charges generates a magnetic field. The generated first magnetic field may have a known form, for example, the generated first magnetic field may be a symmetric magnetic field, i.e. rotational invariant magnetic field.

Further, at least two of the at least three sensor elements are configured to receive a second magnetic field, respectively measure a property of a second magnetic field they encounter. This second magnetic field is the first magnetic field affected by the target. As such, the second magnetic field conveys the information how it was affected by the target. The at least two sensor elements, which receive the second magnetic field may also be referred to as receiving sensor elements. It can also be said that the magnetic field lines, which are emanated from the at least one transmitting sensor element couple via the target to the at least two receiving sensor elements. Hence, it can also be said that the magnetic flux emanated by the at least one transmitting sensor element is coupled to the at least two receiving sensor elements via the target. Thereby, the magnetic flux is a measurement of the total magnetic field which passes through a given surface. Hence, the magnetic flux is related to the number of magnetic field lines of the magnetic field, which pass through the given surface, i.e. the density of the magnetic field lines. The magnetic flux coupling causes the receiving sensor elements to each output a current or a voltage, wherein the magnitude of the outputted current or voltage is dependent upon the encountered magnetic flux. It can also be said that the respective sensor elements output a signal, which is associated with the received second magnetic field. For example, if the receiving sensor elements are Hall elements, then a Hall voltage is generated. If the receiving sensor elements are inductive elements, for example coils, then a current is generated. The induced current may however also be associated with an inductive voltage. Thereby, the encountered currents or voltages give a direct indication of how the target has affected the first magnetic field emanated from the at least one transmitting sensor element. For example, the encountered currents or voltages give an indication how the emanated first magnetic field was deformed, i.e. how the course of the first magnetic field lines of the emanated first magnetic field was altered, by the target. In turn, the encountered currents or voltages give an indication how much of the originally emanated first magnetic flux is received by the at least two receiving sensor elements. Since the currents or voltages are dependent upon the magnetic flux encountered by the at least two receiving sensor elements they give an indication of the position of the target. Furthermore, a change in the currents or voltages can be used to determine a change in the position of the target, since when the position of the target changes also the emanated first magnetic field is affected differently, which in turn means the magnetic flux encountered by the at least two receiving sensor elements changes. The position determination may be outputted by the sensor as a signal.

Thereby, the at least two sensor elements form at least one sensor element pair. Hence, the current or voltage values outputted by the at least two sensor elements are then combined to provide a signal indicative of the position of the target. For example, the outputted values may be subtracted, whereby one value of one receiving sensor element represents the minuend and the other value of the other receiving sensor element represents the subtrahend of the subtraction. It can also be said that the at least two sensor elements are operated in a differential manner or differential mode, since a difference is formed. By performing such a differential measurement, an influence which acts upon both receiving sensor elements substantially alike is canceled. For example, a stray field, which carries a magnetic flux, which influences both receiving sensor elements alike is cancelled due to the subtraction. The outputted values may however also be summed, whereby one value of the of one receiving sensor element represents one addend and the other value of the other receiving sensor element represents the other addend of the summation. It can also be said that the at least two sensor elements are operated in a common manner or common mode, since a summation is formed. It is clear to a person skilled in the art that it can be switched between the operational modes and that in one time instance the difference of the output values of at least two sensor elements can be formed, whereas in another time instance the sum can be formed.

Therefore, the apparatus according to the invention for the first time allows to determine a position of a target with a sensor, wherein the position sensing is invariant with respect to a stray field.

The coupling between the at least one transmitting sensor element and the at least two receiving sensor elements may be affected, i.e. influenced, by the target and in particular the shape or form of the target. The shape or form of the target may influence the magnetic field lines emanated from the at least one transmitting sensor element to align in a preferred direction. Hence, if the target is moved and at least one receiving sensor element lies within this preferred direction, the magnetic flux coupling between the at least one transmitting sensor element and the respective at least one receiving sensor element is the highest, whereas the other of the at least two receiving elements may not lie within the preferred direction and may encounter a weaker magnetic flux coupling, such that the at least two receiving elements will generate different currents or voltages. This situation changes again, when the target is moved and as such the emanated first magnetic field is again affected differently. Based on the amount of measured property, for example induced voltage or current, at each one of the at least two receiving sensor elements, the position of the target can be determined, because the amount of the property measured at each of the at least two receiving sensor elements gives a measure of the magnetic flux coupling. If the property is high, then the magnetic flux coupling is high, which in turn means the preferred direction of the target is aligned with a connecting line of the at least one transmitting sensor element and the respective one of the at least two receiving sensor elements. If the amount of the property is low, then the magnetic flux coupling is low, which in turn means the preferred direction of the target is not aligned with a connecting line of the at least one transmitting sensor element and the respective one of the at least two receiving sensor elements. Besides only affecting the emanated first magnetic field, by influencing the direction or the orientation of the magnetic field lines, it may also be possible for the target to concentrate the magnetic field lines at a particular region, for example at the location of one of the receiving sensor elements. Further, it may also be possible for the target to push the magnetic field lines aside from a particular region. Thereby, it may be possible to reduce the number or the density of the magnetic field lines in the location of at least one of the receiving sensor elements.

The shape or form of the target may affect the coupling of the magnetic flux of the emanated magnetic field in an offset invariant manner. Thereby, offset invariant manner refers to the fact that the target has a shape or form, which affects the magnetic flux coupling between the at least one transmitting sensor element and the at least two receiving sensor elements in a way that a target offset has only minimal to no effect on the current or voltage outputted by the at least two receiving elements. Thereby, the target may have a non-rotational invariant shape or form. For example, if the target is used for angular position determination, the shape or form of the target may be non-rotational invariant with respect to a rotation of the target relatively to the at least three sensor elements. If the target shall be used for linear position determination, the shape or form of the target may change with respect to a direction of an expected linear change of the position of the target relatively to the at least three sensor elements. In any of these cases, non-rotational invariant means that, the shape or form of the target as seen from a location of the sensor elements, in particular from at least one specific sensor element, may not be the same when the target is rotated about an axis in an arbitrary angle. Hence, it may also be said that the shape or form of the target is anisotropic. An anisotropic target is characterized in that the shape or form of the target is different if it is viewed from different directions. This means the shape or form of the target affects the course of the magnetic field lines of the emanated first magnetic field differently for different positions of the target. Hence, the shape or form of the target may cause the magnetic field lines of the emanated magnetic field to align with this preferred direction. This alignment is not changed if the target is offset, because an offset caused for example by a displacement of the target may not change how the shape or form of the target influences the course of the magnetic field lines of the emanated first magnetic field. In other words, the target facing the sensor may define a target plane and the shape or form of the target within this target plane may be translational invariant on at least one axis comprised in the target plane. This in turn means that even so the target is offset, the relative magnetic flux coupling between the at least one transmitting sensor element and the at least two receiving sensor elements, remains substantially the same, even when the target is offset. The information how the target effects the first magnetic field is part of the received second magnetic field. Hence, by measuring the second magnetic field and canceling stray field parts from the second magnetic field, the position of the target can be determined.

In one preferred embodiment of the invention, the number of sensor elements generating the first magnetic field is lower than the number of sensor elements receiving the second magnetic field. For example, only one sensor element may generate the magnetic field, whereas a higher number of sensor elements may receive the second magnetic field. Thereby, the different receiving sensor elements may form sensor element pairs, i.e. one signal is outputted by two receiving sensor elements. All of the receiving sensor element pairs may thereby output a signal at the same time, such that based on the knowledge of the position of the receiving sensor element pairs to one another and the known preferred direction of the target, the effect the target has got on the first magnetic field can be measured from different locations. This has the advantage that the position can be accurately determined, by combining several measurements. This position determination is preferably performed when the target rapidly changes its position, because then for every instant in time several measurements from several locations are taken. If the target is not moving rapidly, it is possible to combine output signals of different receiving sensor elements in a successive manner and not all at once.

In one preferred embodiment of the invention, the number of sensor elements generating the first magnetic field may be higher than the number of sensor elements receiving the second magnetic field. For example, at a given time only one sensor element pair is measuring the second magnetic field and the remaining sensor elements contribute to generating the first magnetic field. In this case the first magnetic field is a superposition off all the magnetic fields generated by the respective sensor elements. In order to also in this case achieve several measurements of the second magnetic field, the operational mode of the sensor elements may be changed, i.e. at one point in time at least two sensor elements receive the magnetic field, whereas the other sensor elements generate the first magnetic field. In another point in time, the same sensor elements which before were the receiving sensor elements also generate the first magnetic field, whereas at least two of the other sensor elements, which before were generating the first magnetic field now receive the second magnetic field. This operational mode change can then be cyclically repeated to get several measurements from different locations. This position determination is preferably performed when the target not rapidly changes its position, i.e. changes its position slower than the change of the operational mode of the sensor elements, since then measurements from several locations at different time instances still are able to be used to determine the position of the target.

In one preferred embodiment of the invention, at least two of the at least two receiving sensor elements are pairwise spatially opposing each other and form a sensor element pair. The at least one transmitting sensor element may be spatially distant to the at least two of the at least two receiving sensor elements. It can also be said that at least one point within the spatial extend of one of the two opposing sensor elements opposes a point within the spatial extend of the other of the two opposing sensor elements. Thereby, these points may for example be the centers of the two opposing sensor elements. For example, the points within the spatial extend of the receiving sensor elements may be located on a connecting line. A point within the spatial extend of the at least one transmitting sensor element may be located with a particular distance to said connecting line. The particular distance of the at least one transmitting sensor element may lead to an arrangement of the at least three sensor elements in a triangular shape, i.e. if the particular distance is greater than zero. However, it is also possible that the particular distance may be zero, such that the transmitting sensor element is also located on the connecting line between the sensor elements forming the sensor element pair.

In one preferred embodiment of the invention, the at least three sensor elements are arranged in such a configuration that the at least two receiving sensor elements encounter substantially the same magnetic flux from the generated first magnetic field. This means both receiving sensor element output substantially the same signal. This signal can then be cancelled. For example by ease of forming the difference between the respective outputs of the sensor elements. This is advantageously since the first magnetic field generated by the transmitting sensor element without being affected by the target does not carry any position information of the target. Hence, suppressing the influence this first magnetic field has got on the receiving sensor elements enhances the position determination capability. Thereby, the at least two receiving sensor elements may be arranged equidistant from the at least one transmitting sensor element. However, if the transmitting sensor element emanates a first magnetic field which does not propagate uniformly or the receiving sensor elements are of a different kind, then also different distances for the respective receiving sensor elements may be encountered. The distances may then be chosen as such that the receiving sensor elements encounter the same magnetic flux.

In one preferred embodiment of the invention, the at least one sensor element generating the first magnetic field at least partially and spatially overlaps with the at least two sensor elements receiving the second magnetic field. This means, the spatial extend of each of the at least two receiving sensor elements has at least some overlap with the spatial extend of the at least one transmitting sensor element. This overlap is preferably as such that the induced property from the first magnetic field within the receiving sensor elements is substantially zero. This is achieved, by configuring the overlap as such that the magnetic flux encountered within the overlap and outside of the overlap induce counteracting properties within the receiving sensor elements, such that they cancel each other out. This is advantageously since the first magnetic field generated by the transmitting sensor element without being affected by the target does not carry any position information of the target. As such, the first magnetic field and its accompanying magnetic flux is detrimental to the position determination. However, by configuring the overlap as such that this first magnetic field and its accompanying magnetic flux has substantially no effect, the position determination capability is enhanced, since then the second magnetic field, which carries the position information can be measured without detrimental parts of the first magnetic field.

In one preferred embodiment of the invention, the at least one sensor element generating the first magnetic field spatially surrounds the at least two sensor elements receiving the second magnetic field. This means the spatial extend of the at least two receiving sensor elements overlap fully with the spatial extend of the at least one transmitting sensor element.

In one preferred embodiment of the invention, at least one sensor element of the at least three sensor elements generating the first magnetic field is located at a center of the at least two sensor elements of the at least three sensor elements. Thereby, at the center means that at least one point in the spatial extend of the at least one generating sensor element is located on a connecting line between one point in the spatial extend of one of the at least two receiving sensor elements and a point within the spatial extend of the other of the receiving sensor elements. For example, the respective points may be the center points of the respective spatial extends. Further or additionally the at least two sensor elements of the at least three sensor elements may be arranged symmetrically with respect to the at least one sensor element of the at least three sensor elements generating the first magnetic field.

In one preferred embodiment of the invention, at least one of the three sensor elements is arranged within a first plane. Within the first plane also more than one of the at least three sensor elements may be arranged. For example, the at least two receiving sensor elements may be arranged in the first plane, whereas the at least one transmitting sensor element may be arranged in a second plane distant from the first plane. As such, it can also be said that the at least two receiving sensor elements are arranged in a plane different to the plane in which the at least one transmitting sensor element is arranged. Thereby, these planes may be parallel to one another. For example, the planes may be arranged on different layers of a substrate of a semiconductor chip.

In one preferred embodiment of the invention, at least a portion of the at least three sensor elements is configured to change its operational mode from generating the first magnetic field to receiving the second magnetic field and vice versa. However, it is clear to a person skilled in the art that the sensor elements may also possess an operational mode in which they are idle, hence neither generating nor receiving. Thereby, at least a portion of the sensor elements may refer to at least one sensor element, or all sensor elements, or an arbitrary number of sensor elements greater than one. In detail, the at least three sensor elements may be configured in a first operational mode such that, at a single point in time, at least one of the at least three sensor elements is generating the first magnetic field and that the other two sensor elements of the at least three sensor elements are receiving the second magnetic field. In a second operational mode, at a subsequent point in time, the at least three sensor elements may change their operational modes such that, another one of the at least three sensor elements is generating the first magnetic field while the respective other at least two sensor elements receive the second magnetic field. It is clear to a person skilled in the art that the sensor elements, which in a first point in time operate in a first operational mode, do not need to change to the second operational mode in a second point in time. As such, all the sensor elements may have different operational mode cycles, which may be independent from the operational mode cycles of the other sensor elements. This change of operational mode may follow a particular operating cycle with a particular cycle time. This means the magnetic flux coupling between the transmitting sensor element and the at least two receiving sensor elements can not only be measured with one configuration, but actually with several, such that more than one position determination can be performed. For example, if the cycle times are low in comparison to the change of the position of the target, the different measurements taken at subsequent points in time can be used to enhance position determination capabilities. Although the at least three sensor elements may be configured to change their operational modes, it may also be possible that at least one sensor element of the at least three sensor elements keeps its operational mode while the respective other sensor elements change their operational modes. Furthermore, it is clear that the sensor elements may not only independently change their operational mode between receiving and transmitting, but may also change their sensitivity and/or the strength of the magnetic field they generate.

In one preferred embodiment of the invention, the at least one transmitting sensor element is configured to generate an alternating first magnetic field. While each magnetic field is characterized by a north pole and a south pole, an alternating magnetic field is characterized by a change in the position of the north pole and the south pole. For example, the north and the south pole may fluctuate such that after a certain time, the north pole becomes the south pole while the south pole becomes the north pole. This fluctuation may be periodic and may be characterized by a periodic duration. This periodic duration may be the cycle time of the alternating first magnetic field. Technically, the alternating first magnetic field may be caused by driving the at least one transmitting sensor element with an alternating current or voltage. The generated first magnetic field may be a symmetric magnetic field, i.e. may be a rotational invariant magnetic field. If the first magnetic field is produced by several transmitting sensor elements, then these transmitting sensor elements can produce synchronized alternating magnetic fields or non-synchronized alternating magnetic fields. For example, one transmitting sensor element may produce in one time instance, i.e. a fixed point in time with no duration, a magnetic field, which north pole is facing the target, whereas in the same time instance a second transmitting sensor element is producing a magnetic field, which north pole is also facing the target, whereas in a second time instance both transmitting sensor elements produce each a magnetic field which south pole is facing the target. In this respect, it can also be said that the at least two transmitting sensor elements produce synchronized alternating magnetic fields. However, they can also produce both non-synchronized alternating magnetic fields. For example, one transmitting sensor element may produce in one time instance a magnetic field, which north pole is facing the target, whereas in the same time instance a second transmitting sensor element is producing a magnetic field, which south pole is facing the target, and vice versa in a second time instance.

In one preferred embodiment of the invention, the at least one transmitting sensor element is inductively coupled to the at least two receiving sensor elements via the target. The target affects the emanated first magnetic field, i.e. the target deforms the emanated first magnetic field. This deformation is caused by induced eddy currents within the target, wherein these eddy currents are induced by the first magnetic field emanated by the at least one transmitting sensor element. These eddy currents themselves produce a magnetic field, which leads to the deformation of the emanated first magnetic field. The deformed emanated first magnetic field is then measured by the at least two receiving sensor elements. It can also be said that the effect the target has got on the emanated first magnetic field is measured, such that by ease of this measurement the position of the target can be determined. The eddy currents induced within the target and their associated magnetic field are dependent upon the shape or form of the target and how the eddy currents can flow within the target. As such, the deformation of the emanated first magnetic field caused by the target is dependent upon its shape or form. It is thereby clear to a person skilled in the art that the first magnetic field generated by at least one transmitting sensor element comprises a gradient in the magnetic flux, which causes the eddy currents to flow within the target. If more than one transmitting sensor element is used, the first magnetic field is constituted by the superposition of the at least two magnetic fields produced. In order to also in this case encounter a gradient in the first magnetic field, either the magnetic fluxes of the generated magnetic fields can be different and/or the direction of the generated magnetic fields can be different.

In general, it can be said that the magnetic flux of the impinging magnetic field at the target generates eddy currents that will flow along discrete paths defined by structures of the target. Thereby, some of these eddy currents may cancel out each other, whereas others will be strengthened dependent upon the difference in geometry of the structures and/or the difference in magnetic fluxes impinging on the target.

For example, if the target has got structures with the same inductance, the impinging magnetic field needs to exhibit a gradient, in order that the partially and/or purely induced eddy currents are not cancelled out, whereas if the target has got structures with difference in inductance between adjacent structures, the magnetic field does not need to exhibit a magnetic gradient. As such, with the geometry of the structures and therefore the shape or form of the target, it can be accounted for different impinging magnetic field situations.

This can be exploited, for example in order to increase the eddy currents along the preferred direction of the target. Hence, in turn increase the magnetic field produced by the eddy currents and as such increase the effect of the target.

The target's shape or form deforms the emanated magnetic field in a preferred direction by defining conductive paths, along which the eddy currents can flow, which themselves produce a magnetic field, which affects the first magnetic field. Because the target is non-rotational invariant, this preferred direction is only encountered at discrete positions of the target, such that the target's position can be determined based on the measurement of the deformation of the emanated first magnetic field. Thereby, the deformed emanated first magnetic field is the second magnetic field and causes a current or voltage at the at least two receiving sensor elements. The magnitude of the caused current or voltage caused at the at least two receiving sensor elements is dependent upon how the target and as such the preferred direction of the deformation of the emanated first magnetic field is orientated relatively to the at least two receiving sensor elements, such that the current or voltage values give an indication of the orientation and as such the position of the target.

In one preferred embodiment of the invention, the at least three sensor elements are coils. When a current is passed through these coils a magnetic field is generated. The strength of the magnetic field and as such the amount of magnetic flux produced is proportional to the amount of current provided to the coil. If the coils are exposed to a magnetic field, for example the second magnetic field, then a current is induced in the coils. As such dependent upon whether a current is passed through the coils or is induced in the coils, the sensor elements are termed transmitting sensor element or receiving sensor element. Thereby, the spatial extend of the coils can be the same or different. For example, the spatial extend of the transmitting sensor element, i.e. the transmitting coil, can be larger than the spatial extend of the receiving sensor elements, i.e. the receiving coils. Thereby, a larger transmitter coil produces a stronger first magnetic field than a smaller transmitter coil, as such the second magnetic field is stronger.

In one preferred embodiment of the invention, the at least three sensor elements are implemented together with means for driving the at least one transmitting sensor element and/or with means for processing signals that are outputted by the at least two receiving sensor elements. The means for driving the at least one transmitting sensor element may be configured to provide the at least one transmitting sensor element with an alternating current. The means for processing may combine the signals, i.e. the current or voltage values, outputted by the at least two receiving sensor elements. The means for processing may form a difference and/or a sum of the values outputted by the at least two receiving sensor elements. The means for processing may in addition to forming the difference and/or the sum also perform other mathematical combinations with the outputted values. Thereby, the calculations may be used for correcting target offsets. For example, the surface of the target facing the sensor may define one plane and at least one of the receiving sensor elements may define a second plane. If these two planes are not parallel to one another, respectively are inclined to one another, then the gap between the target and the sensor is also inclined. Hence, the receiving elements have not all the same distance from the target, which in turn means the induced property at the receiving elements which are located closer to the target will be higher than the induced property at the receiving elements which are located farther away from the target. By averaging the values outputted by the at least two receiving elements it can be accounted for this effect. Hence, the means for processing may not only form the difference and summation, but may also perform compensations. Further, the means for processing may also perform other mathematical operations, like forming ratios etc. Furthermore, the means for processing may perform a comparison of the signal and stored values. The stored values thereby may give an indication of values to be expected by the receiving elements for particular positions of the target. The stored values may thereby be stored during an initial calibration run or may be modelled results. The sensor may therefore also comprise means for storing. The means for storing may thereby store the values in a lookup table. The respective values may also be referred to as reference values. The means for driving the at least one transmitting sensor element and/or the means for processing and/or the means for storing may be implemented in one die or a molded package for a semiconductor chip.

In one preferred embodiment of the invention, at least two of the at least two receiving sensor elements forming the sensor element pair are hardwired to form a signal.

In one preferred embodiment of the invention, the shape or form of the target, which acts together with the sensor according to the invention, can be constituted by a structure, which directs the eddy currents induced in the target by the first magnetic field to flow in a particular direction, such that the effect the target has got on the emanated first magnetic field is also directional, i.e. in one preferred direction. It can also be said that the specific structure of the target provides a moduled conductivity in one direction and an essentially constant conductivity distribution in a second direction. Hence, the impinging first magnetic field is attenuated more in the first direction than in the second direction. Thereby, the particular structure may be formed by at least one recess and/or at least one slit in the target. A slit in the target may extend from one side of the target to the opposite side. For example, the slit may be a hole in the target, wherein said hole has a depth of the entire thickness of the target. In other words, a slot may be configured in such a way that it penetrates the whole thickness of the body of the target. Thereby, the slit may have any shape or form that is suitable to direct the flow of the eddy currents within the target, namely around the slit. A recess however, may extend from one side of the target to a point somewhere inside of the body of the target and does not extend to the opposite side of the target, i.e. a recess may be a hole in the target, wherein said hole has a depth smaller than the entire thickness of the target. Also a recess is used to direct the flow of the eddy currents and as such allows the target to produce a directional magnetic field in order to affect the emanated first magnetic field in a preferred direction, this affected first magnetic field then constitutes the second magnetic field.

In one preferred embodiment of the invention, the target, which acts together with the sensor according to the invention, has a planar shape. Thereby, the surface of the target facing the sensor may span a plane which is substantially parallel to a plane in which at least one of the three sensor elements is arranged.

In one preferred embodiment of the invention, the target, which acts together with the sensor according to the invention, is made from a conductive material. The conductive material may be a metal, in particular, a ferromagnetic metal.

However, the person skilled in the art will also contemplate that other materials as metal may be used, which possess conductive properties.

The above-mentioned object is also solved by a method for sensing a position of a target. Thereby, the method comprises the steps of generating a first magnetic field by at least one sensor element of at least three sensor elements, receiving a second magnetic field by at least two sensor elements of the at least three sensor elements wherein the second sensor element is associated with the first magnetic field, and calculating a signal from outputted signals of the at least two receiving sensor elements, wherein the signal is indicative of the position of the target. Thereby, the calculated signal can be the difference and/or the sum of the outputted signals of the at least two receiving sensor elements.

In one preferred embodiment of the invention, the method further comprises calculating at first a differential signal from the outputted signals of the at least two receiving sensor elements to determine a 180° ambiguity of the target and then calculating the sum from the outputted signals of the at least two receiving sensor elements to determine the position of the target, wherein the sum signal has a better signal to noise ratio than the differential signal.

In one preferred embodiment of the invention, the method further comprises comparing the value of the signal or signals to stored values, which are either modelled or taken during a calibration run. The stored values thereby give an indication of the signal value or values to be expected for a particular position of the target.

The above-mentioned object is also solved by a system for sensing a position of a target, in particular for offset invariant sensing of the position of the target. Thereby, the system comprises at least three sensor elements, which may be referred to as a sensor, and a target. Thereby, at least one sensor element of the at least three sensor elements generates a first magnetic field, wherein at least two sensor elements of the at least three sensor elements receive a second magnetic field which is associated with the first magnetic field and wherein at least two sensor elements of the at least three sensor elements form at least one sensor element pair and provide a signal indicative of the position of the target.

BRIEF DESCRIPTION OF THE DRAWINGS

The following description and the annexed drawings set forth in detail certain illustrative aspects of the apparatus, the target, and the method described above. These aspects are indicative, however, of but a few of the various ways in which the principles of various embodiments can be employed and the described embodiments are intended to include all such aspects and their equivalent.

In the drawings, like reference characters generally refer to the same parts throughout the different drawings. The drawings are not necessarily to scale, emphasis instead generally being placed upon illustrating the principles of the invention.

Figure 1:
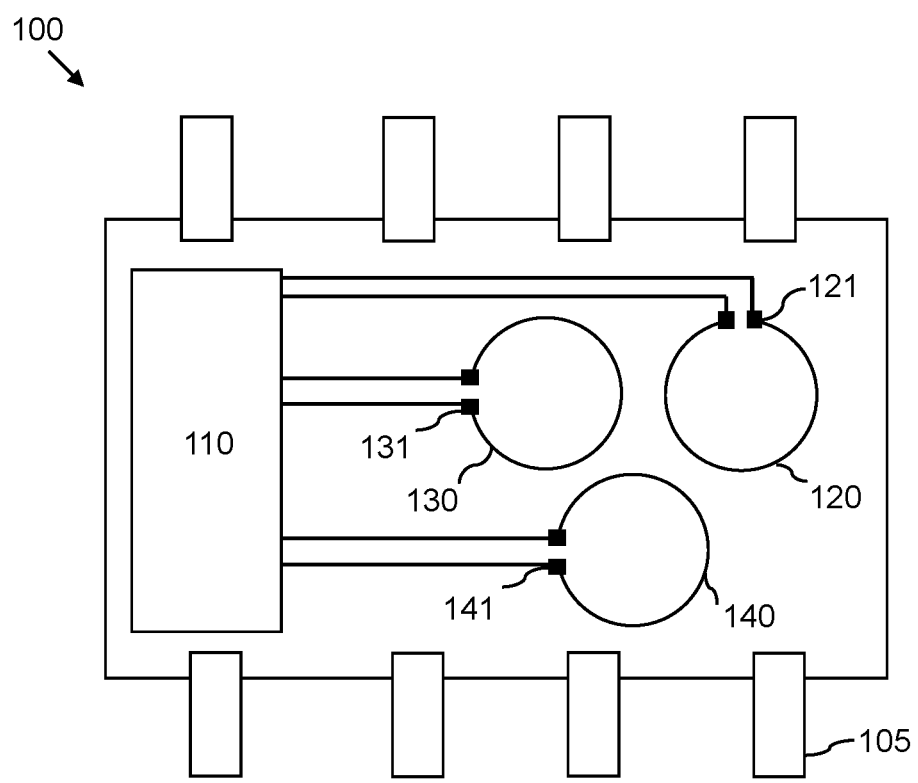
Figure 2A:
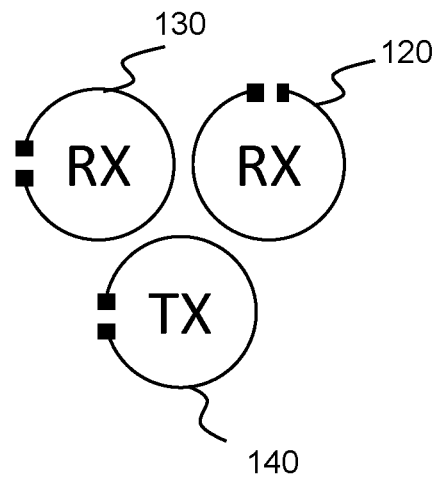
Figure 2B:
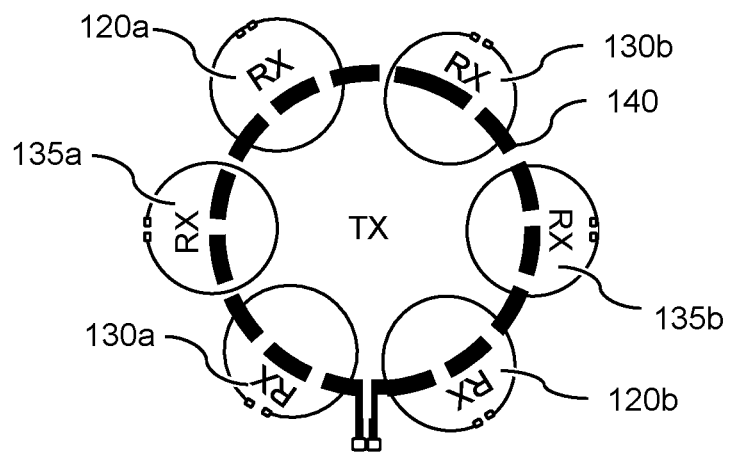
Figure 2C:
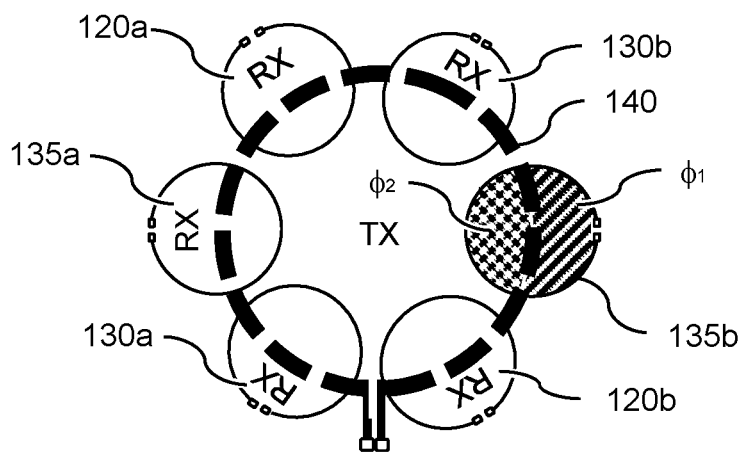
Figure 2D:
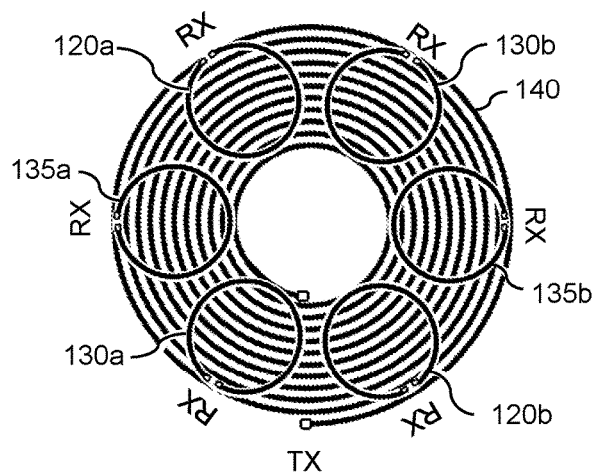
Figure 2E:
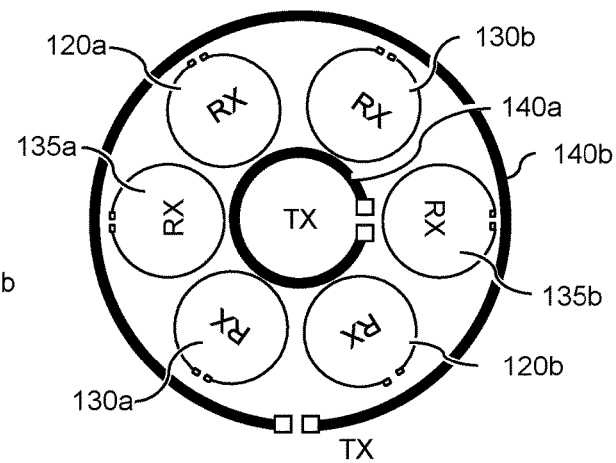
Figure 2F:
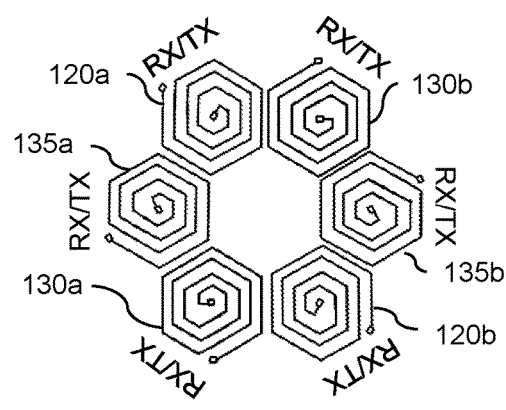
Figure 2G:
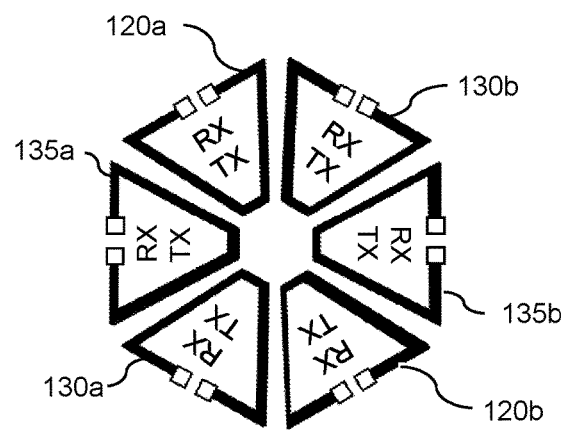
Figure 2H:
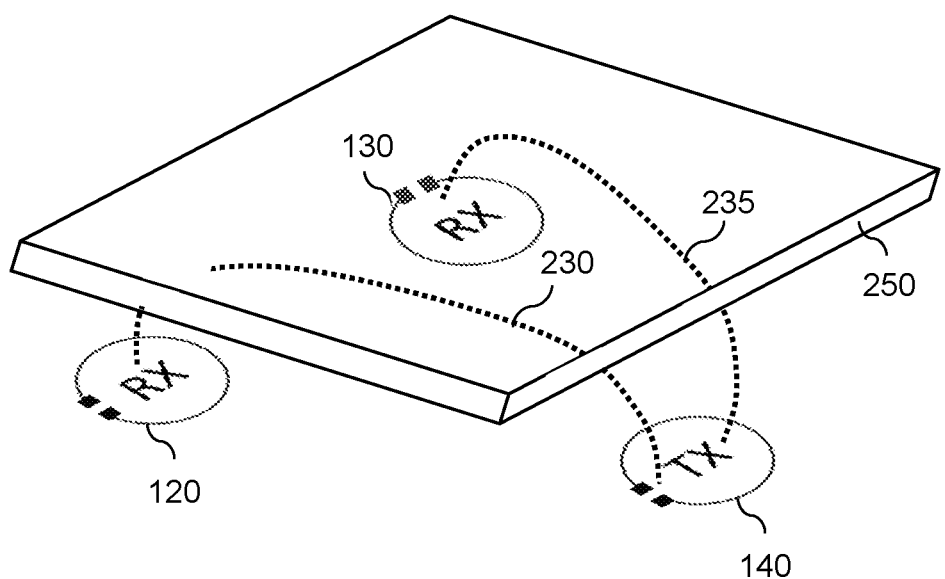
Figure 3A:
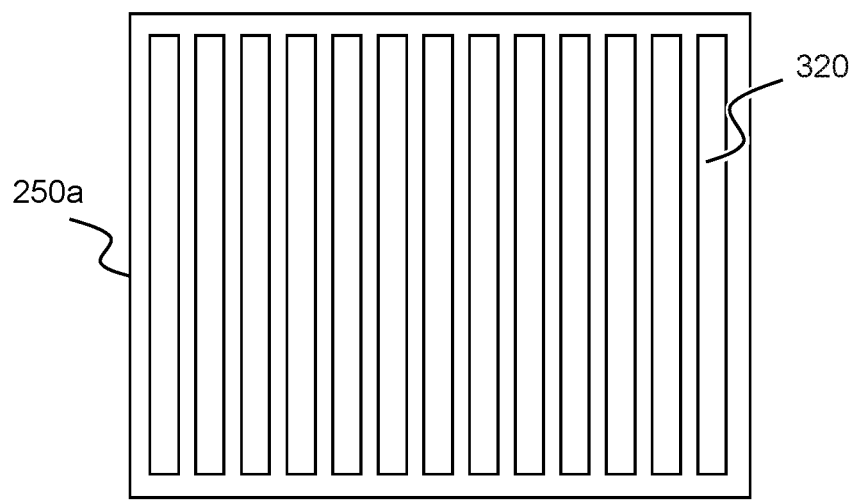
Figure 4A:
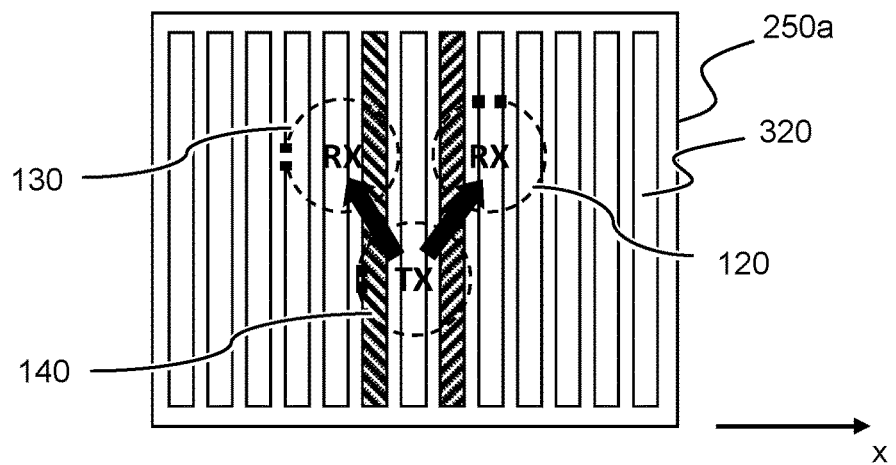
Figure 5A:
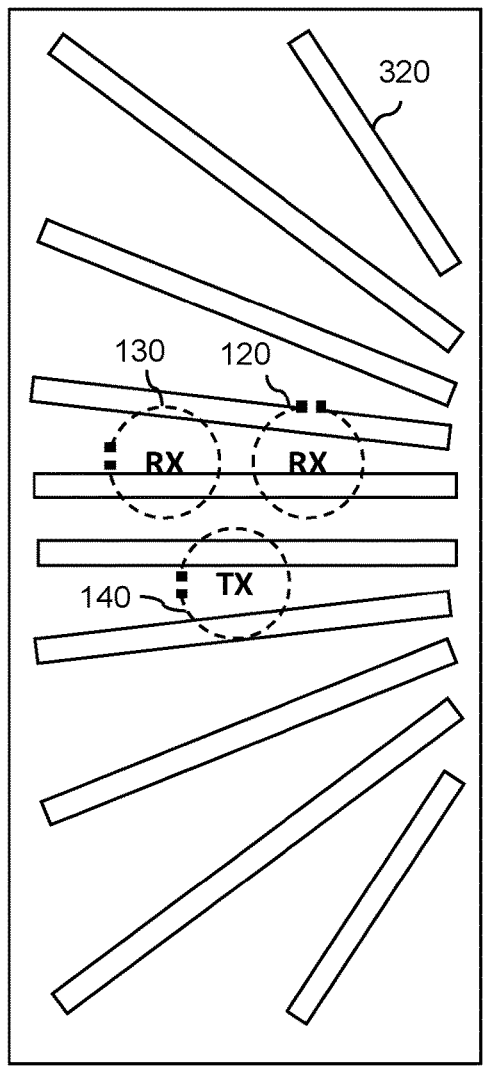
Figure 6:
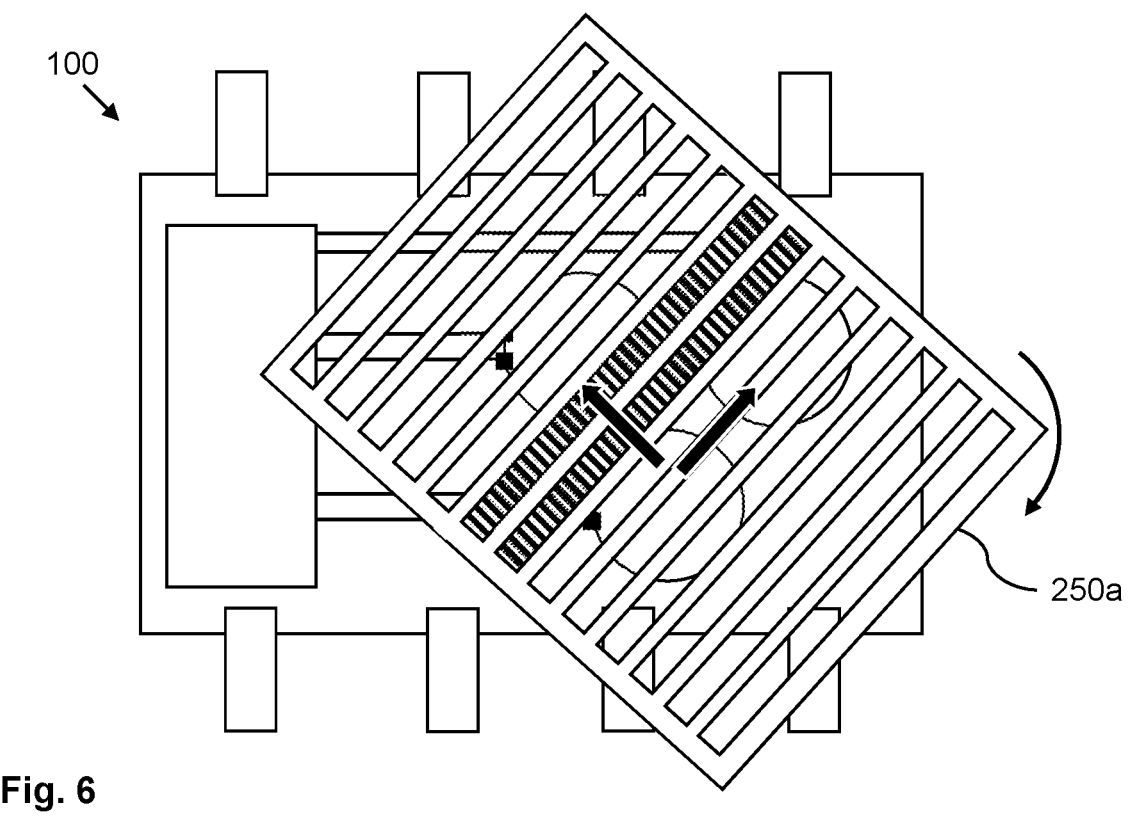
Figure 7:
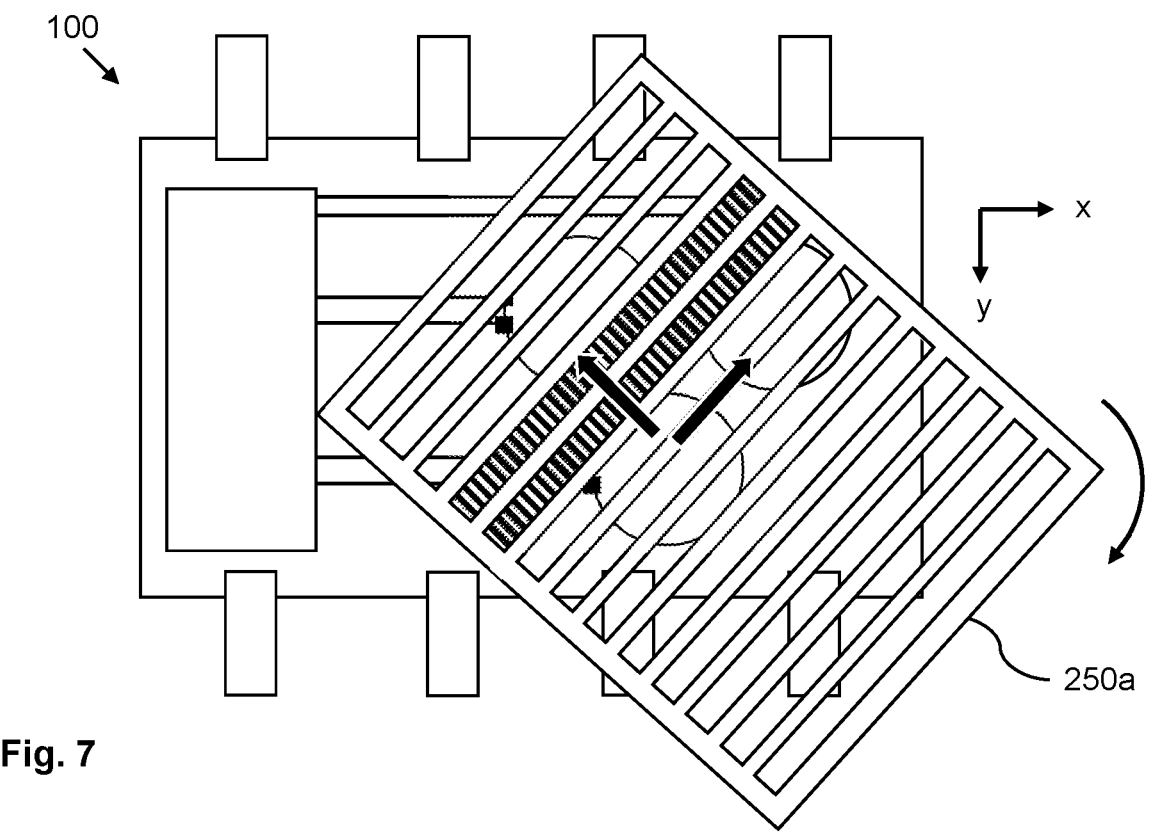

In the following description, various embodiments of the invention are described with reference to the following drawings, in which:

FIG. 1 shows a plan view of a sensor chip according to one embodiment example of the invention;

FIG. 2a, b, c, d, e, f, g show exemplary spatial arrangements of sensor elements;

FIG. 2h shows a generic magnetic flux coupling between the sensor elements as shown in FIG. 2a and a target;

FIG. 3a, b, c show different embodiment examples of a target according to the invention;

FIG. 4a, b, c, d, e show the target according to the embodiment example of FIG. 3a arranged on top of the sensor elements as shown in FIG. 2a in different angular positions;

FIG. 5a, b show a different embodiment of a target according to the invention arranged on top of the sensor elements as shown in FIG. 2a;

FIG. 6 shows a plan view of the sensor chip of FIG. 1 and the target according to the embodiment example of FIG. 3a; and FIG. 7 shows the plan view of the sensor chip and the target of FIG. 6, wherein the target is offset to the arrangement of the sensor chip.

DETAILED DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

FIG. 1 shows a plan view of a sensor chip 100 according to one embodiment example of the invention. The sensor chip 100 can also be referred to as a sensor, a position sensor, an inductive sensor, or an inductive position sensor. The sensor chip 100 comprises an arrangement of sensor elements, here at least three sensor elements 120, 130, 140. The at least three sensor elements 120, 130, 140 in the here shown embodiment example do not overlap each other and are indicated by single coil loops. However, it is contemplated by the person skilled in the art that also any other kind of sensor element can be used, which is able to produce and/or receive a magnetic field. It is also contemplated that the at least three sensor elements 120, 130, 140 may be different kinds of sensor elements.

In the embodiment example shown in FIG. 1, each sensor element possesses contacts 121, 131, 141. Via these contacts 121, 131, 141, signals or information in general may be propagated from the sensor elements 120, 130, 140 to an optional determination unit 110. Furthermore, the contacts 121, 131, 141 may be used to provide the sensor elements 120, 130, 140 with an alternating current to generate a magnetic field or to drive the sensor elements in general.

A person skilled in the art will contemplate that even so in the here shown embodiment example the determination unit 110 is part of the sensor chip 100, this is only for illustrative purposes and the determination unit 110 can also be external to the actual sensor chip 100 or can be absent all together.

The sensor chip 100 may also comprise contacts 105, with which the sensor chip 100 can be connected to circuit boards and with which signals can be inputted and outputted from and to the sensor chip 100. Thereby, the contacts 105 can either be connected to the determination unit 110, or if the determination unit 110 is absent, the contacts 105 can be connected to the contacts 121 and 131.

FIGS. 2a to 2g show exemplary different spatial arrangements of sensor elements. Thereby, in some of the figures the sensor elements are further denoted "TX" and "RX". Thereby, "TX" indicates that the respective sensor element is generating a magnetic field, as such the sensor element denoted "TX" can also be named transmitting sensor element. The sensor elements denoted "RX" receive the magnetic field, as such the sensor elements denoted "RX" can also be named receiving sensor elements. It shall however also be understood that the sensor elements may change their operational mode from transmitting to receiving, such that the here shown embodiment examples may only refer to an operational mode configuration of the illustrated sensor elements at one given point in time. Thereby, the sensor elements may be configured to independently change their operational mode from receiving to transmitting and vice versa. Although the at least three sensor elements may be configured to change their operational modes, it may also be possible that at least one sensor element of the at least three sensor elements keeps its operational mode while the respective other sensor elements change their operational modes. Furthermore, even so the sensor elements in the here shown embodiment examples are shown to be in one plane, the sensor elements can also be arranged in different planes, wherein these planes may be distant to one another. For example each sensor element may be implemented on a different layers of a substrate of a semiconductor chip. However, it is also conceivable that at least some or all of the sensor elements are implemented on the same layer of a substrate of a semiconductor chip. Furthermore, it is contemplated that the different sensor elements may change their sensitivity and/or the strength of the magnetic field they produce.

In FIG. 2a a triangular arrangement of the sensor elements 120, 130 and 140 is shown. Thereby, sensor element 140 is the transmitting sensor element and the sensor elements 120 and 130 are the receiving sensor elements, which form a sensor element pair. The sensor elements 120, 130 and 140 in the here shown embodiment examples are all electrically conductive coils. This means if a current passes through the transmitting sensor element 140 the first magnetic field is generated. Thus generated first magnetic field couples via the target to the two sensor elements 120 and 130, into which a current is induced due to the coupling, respectively due to the magnetic flux associated with the magnetic field. These induced currents can be outputted by the sensor elements 120 and 130 as their measured signal and can form a signal. This signal gives an indication of how the target has affected the magnetic field generated by the transmitting sensor element 140 and in turn how the preferred direction of the target is orientated in comparison to the two sensor elements 120 and 130. Since the position of the sensor elements 120, 130, and 140 with respect to each other is known as well as the utilized target, the position of the target can directly be calculated from the induced properties. However, it is also possible that during a calibration run the respective induced properties have been correlated with the position of the target, then this information can be used to determine the position of the target from the signal. Thereby, the respective induced properties for the calibration run may be stored in a lookup table and may be compared to the measured current values, respectively the signal, to determine the position of the target. It is however also possible that instead or additionally to a calibration run modelled results are stored, which can be compared to the measured induced properties, respectively the signal. The induced properties may be the induced currents induced voltages in the receiving sensor elements 120, 130.

Also other arrangements of the sensor elements and in particular the number of the sensor elements are conceivable, some of which are depicted for illustrative purposes in FIGS. 2b to 2g. It is clear to a person skilled in the art that for these further illustrative embodiment examples the same inventive principle applies as discussed with regards to FIG. 2a.

FIG. 2b shows seven electrically conductive coils 120a-b, 130a-b, 135a-b and 140. Thereby, coils 120a-b, 130a-b, 135a-b are receiving coils, while the coil 140 is a transmitting coil (depicted as circular loop with a dashed line). The transmitting coil 140 has a substantially greater diameter than the receiving coils 120a-b, 130a-b, 135a-b. The receiving coils 120a-b, 130a-b, 135a-b are arranged on a circular line. In detail they are arranged on the outer circumference of the circle formed by the transmitting coil 140, wherein the center points of the spatial extend of the receiving coils 120a-b, 130a-b, 135a-b are uniformly distributed along the circumference. Hence, it can be said that the receiving coils 120a-b, 130a-b, 135a-b at least partially and spatially overlap with the spatial extend of the transmitting coil 140. The receiving coils 120a-b, 130a-b, 135a-b may thereby be implemented in one plane, for example one layer of a substrate of a semiconductor chip, whereas the transmitting coil 140 may be implemented in another plane, for example another layer of the substrate of the semiconductor chip.

If the area covered by the transmitting coil 140 is larger than the area covered by at least one of the receiving coils 120a-b, 130a-b, 135a-b, the first magnetic field generated by this transmitting coil 140 induces substantial currents, respectively voltages, in the receiving coils 120a-b, 130a-b, 135a-b. However, not only the first magnetic field affected by the target, i.e. the second magnetic field, induces the substantial currents respectively voltages, but also the non-affected first magnetic field. Generally, these induced currents respectively voltages are referred to as common mode currents or common mode voltages or in general common mode signal. This common mode signal does not carry any position information with regards to the target. With the arrangement of the coils 120a-b, 130a-b, 135a-b, 140 as shown in FIG. 2b this common mode signal is however be suppressed. The suppression is explained in context of FIG. 2c.

FIG. 2c shows the coil 120a-b, 130a-b, 135a-b, 140 arrangement as depicted in FIG. 2b. The receiving coils 120a-b, 130a-b, 135a-b at least partially and spatially overlap the transmitting coil 140. In the here shown embodiment example, the receiving coils 120a-b, 130a-b, 135a-b are arranged as such, that substantially half of their spatial extend overlaps with the spatial extend of the transmitting coil 140. It can also be said one half of the receiving coils 120a-b, 130a-b, 135a-b lies within the spatial extend of the transmitting coil 140, whereas the other half lies outside of the spatial extend of the transmitting coil 140. This means each of the halves of the receiving coils 120a-b, 130a-b, 135a-b is passed through by a different magnetic flux $\phi_1$ and $\phi_2$ as indicated with the shaded areas of receiving coil 135b. Although the different magnetic fluxes $\phi_1$ and $\phi_2$ are both generated by the same transmitting coil 140, $\phi_1$ and $\phi_2$ have different directions, as one magnetic flux $\phi_1$ is part of the magnetic flux outside the transmitting coil 140 and the other magnetic flux $\phi_2$ is part of the magnetic flux inside the transmitting coil 140. The induced property (voltage or current) within the receiving coils 120a-b, 130a-b, 135a-b is a superposition of the induced properties created by the two magnetic fluxes $\phi_1$ and $\phi_2$. In order to suppress the common mode signal, the effect the magnetic fluxes $\phi_1$ and $\phi_2$ have got on the receiving coils 120a-b, 130a-b, 135a-b must counteract each other. This is the case when the magnetic flux $\phi_1$ substantially equals the magnetic flux $\phi_2$, because then the induced property has substantially the same value, but one is positive and the other is negative. In the here shown embodiment example this is achieved by arranging the receiving coils 120*a-b*, 130*a-b*, 135*a-b* in such a way that half of their spatial extend overlaps with the spatial extend of the transmitting coil 140, whereas the other half does not. However, it is clear to a person skilled in the art that in other configurations also other overlaps have to be used. Thereby, it is important that the magnetic flux $\phi_1$ outside the overlap area is substantially the same as the magnetic flux $\phi_2$ inside the overlap area such that that the two magnetic fluxes cancel each other out. Since the magnetic flux is not linear, the two areas, hence the overlap area and the non-overlap area may be different in size. For example, since the overlap area will encounter a higher magnetic flux than the non-overlap area, the overlap area needs to be substantially smaller than the non-overlap area, such that in the non-overlap area still a high enough magnetic flux is encountered to cancel the magnetic flux within the overlap area. By this the common mode signal is suppressed without having affecting the useable second magnetic field, which carries the position information of the target.

In the embodiment example shown in FIGS. 2*b* and 2*c* receiving coils 120*a* and 120*b* form a first opposing sensor element pair, receiving coils 130*a* and 130*b* form a second opposing sensor element pair, and receiving coils 135*a* and 135*b* form a third opposing sensor element pair. The three sensor element pairs may output three signals at the same time or the different sensor element pairs may each output one signal subsequently to one another. In the latter case different cycle times may be used, i.e. at different times a different sensor element pair may output the signal. Based on the signals, either outputted all at once or subsequently to one another, the position of the target can be determined.

FIG. 2*d* shows another embodiment example of an arrangement of the sensor elements. Here again seven electrically conductive coils 120*a-b*, 130*a-b*, 135*a-b* and 140 are shown. Six of these coils are receiving coils 120*a-b*, 130*a-b*, 135*a-b*, whereas one coil is the transmitter coil 140. In the here shown embodiment example, the transmitting coil 140 is implemented in a distributed way. In the here shown embodiment example, the spatial extend of the receiving coils 120*a-b*, 130*a-b*, 135*a-b* fully overlap with the spatial extend of the transmitting coil 140. Although in the here shown embodiment example, the transmitting coil 140 and the receiving coils 120*a-b*, 130*a-b*, 135*a-b* fully overlap, it is clear to a person skilled in the art that also the overlap can be less than the shown overlap. The transmitting coil 140 in the here shown embodiment example is implemented as wire in the shape of a spiral. The spiral may be substantially flat, such that the spiral shaped wire is arranged in a plane, for example in a layer of a substrate of a semiconductor chip. The receiving coils 120*a-b*, 130*a-b*, 135*a-b* may be arranged in a plane distant to the one of the transmitting coil 140, for example in another layer of the substrate of the semiconductor chip. This arrangement of the receiving and transmitting coils 120*a-b*, 130*a-b*, 135*a-b*, 140 has the advantage of less sensitivity to manufacturing tolerances between coils. Also here, the sensor element pairs may be formed by coils 120*a*/120*b*, 130*a*/130*b*, and 135*a/b*. Although the coil loops in the here shown embodiment example are adjacent to each other, it is contemplated that they can also be spaced further apart, such that only a limited number of coil loops will overlap with the receiving coils 310*a-f*. In other word, it can also be said that at least a portion of at least one loop of the transmitting coil 140 intersects at least a portion of the spatial extend of the receiving coils 120*a-b*, 130*a-b*, 135*a-b*.

FIG. 2*e* shows yet another embodiment example of an arrangement of the sensor elements. Here again six conductive coils 120*a-b*, 130*a-b*, 135*a-b* are used as receiving coils, whereas the embodiment example encompasses two transmitting coils 140*a* and 140*b*. Thereby, at least one transmitting coil 140*b* is arranged to surround the receiving coils 120*a-b*, 130*a-b*, 135*a-b*. Hence, the spatial extend of the receiving sensor elements 120*a-b*, 130*a-b*, 135*a-b* fully overlaps with the spatial extend of the transmitting coil 140*b*. It is clear to a person skilled in the art that also the overlap can be less than the shown overlap. Thereby, in the here shown embodiment example, transmitting coil 140*b* is depicted as a single wire loop surrounding the six receiving coils 120*a-b*, 130*a-b*, 135*a-b*. The other transmitting coil 140*a* is arranged in a center defined by connecting lines of the centers of the differential pairs 120*a*/120*b*, 130*a*/130*b*, and 135*a/b*. This further transmitting coil 140*a* does not spatially overlap with the receiving coils 120*a-b*, 130*a-b*, 135*a-b*. Using the two transmitting coils 140*a* and 140*b* allows for suppressing the common mode signal without the need for an overlap of the transmitting coils 140*a*/140*b* and the receiving coils 120*a-b*, 130*a-b*, 135*a-b*. For example, by having more turns and/or more current flowing in transmitting coil 140*a* as compared to transmitting coil 140*b* a suppression of the common mode signal may be achieved. Hence, with such kind of arrangement, all the coils may be arranged within the same plane, for example the same layer of a substrate of a semiconductor chip.

The shape of the receiving and transmitting coils is not limited to circular shapes as depicted in FIGS. 2*a* to 2*e*. The coils may also be hexagonal or shaped like a sector of a circle, respective embodiment examples are shown in FIGS. 2*f* and 2*g*. It is however clear to a person skilled in the art that the depicted shapes are not limiting.

FIG. 2*f* shows an embodiment example of yet another arrangement of the sensor elements. In the here shown embodiment example, six hexagonal shaped conductive coils 120*a-b*, 130*a-b*, 135*a-b* are present, which are arranged in a circle. Thereby, each coil 120*a-b*, 130*a-b*, 135*a-b* may comprise a wire substantially in the shape of a hexagonal spiral. In the here shown embodiment example, the coils 120*a-b*, 130*a-b*, 135*a-b* are adjacent to one another. The coils 120*a-b*, 130*a-b*, 135*a-b* may be configured to either generate the first magnetic field or to receive the second magnetic field. Further, they may be configured to change their operational mode from generating the first magnetic field to receiving the second magnetic field and vice versa. For example, in a first instance in time, the coils 120*a* and 120*b* may be the receiving coils, whereas the remaining coils 130*a/b* and 135*a/b* are the transmitting coils. The coils 120*a* and 120*b* then form a sensor element pair and output a signal. At another instance in time, the coils 130*a* and 130*b* may be the receiving coils, whereas the remaining coils 120*a/b* and 135*a/b* are the transmitting coils. In this instance in time the coils 130*a* and 130*b* form the sensor element pair and output a signal. In yet another instance in time, the coils 135*a* and 135*b* may be the receiving coils, whereas the remaining coils 120*a/b* and 130*a/b* are the transmitting coils. In this instance in time the coils 135*a* and 135*b* form the sensor element pair and output a signal. The different signals can then be combined to determine the position of the target. It is clear that even so here a clockwise cyclic shift of the receiving coils is described that also any arbitrary cyclic shift may be performed.

FIG. 2*g* shows an embodiment example of yet another arrangement of the sensor elements. In the here shown embodiment example, six conductive coils 120*a-b*, 130*a-b*, 135*a-b* are present, wherein the coils 120*a-b*, 130*a-b*, 135*a-b* are arranged in a circle. Each coil 120*a-b*, 130*a-b*, 135*a-b* may comprise a wire substantially in the shape of a sector of this circle, which may also be referred to as a shape of a trapezoid. Thereby, the wire of the coils 120*a-b*, 130*a-b*, 135*a-b* may comprise a single loop in the shape of a trapezoid or may comprise multiple loops in the shape of a trapezoid. The coils 120*a-b*, 130*a-b*, 135*a-b* may be configured to either generate the first magnetic field or to receive the second magnetic field. Further, they may be configured to change their operational mode from generating the first magnetic field to receiving the second magnetic field and vice versa. For example, in a first instance in time, the coils 120*a* and 120*b* may be the receiving coils, whereas the remaining coils 130*a/b* and 135*a/b* are the transmitting coils. The coils 120*a* and 120*b* then form a sensor element pair and output a signal. At another instance in time, the coils 130*a* and 130*b* may be the receiving coils, whereas the remaining coils 120*a/b* and 135*a/b* are the transmitting coils. In this instance in time the coils 130*a* and 130*b* form the sensor element pair and output a signal. In yet another instance in time, the coils 135*a* and 135*b* may be the receiving coils, whereas the remaining coils 120*a/b* and 130*a/b* are the transmitting coils. In this instance in time the coils 135*a* and 135*b* form the sensor element pair and output a signal. The different signals can then be combined to determine the position of the target. It is clear that even so here a clockwise cyclic shift of the receiving coils is described that any arbitrary cyclic shift may be performed.

Although FIGS. 2*a* to 2*g* refer to explicit coil arrangements and coil shapes, it is clear to the person skilled in the art that further arrangements and shapes are also possible. The depicted sensor elements may each have a maximum size of 5 mm, 8 mm, 10 mm, 15 mm, 20 mm, or 30 mm. The maximum size may be a diameter of a sensor element, an envelope of a sensor element or a length of the longest side of a sensor element or the maximum extend of all sensor elements together in one dimension.

Only for illustrative purposes and with no limiting implications, the following description assumes a sensor element configuration as depicted in FIG. 2*a*.

FIG. 2*h* shows a generic magnetic flux coupling between the sensor elements 120, 130, 140 arrangement as shown in FIG. 2*a* and a target. Although the embodiment example as shown in FIG. 2*h* relies on the sensor element arrangement as shown in FIG. 2*a*, this is only for illustrative purposes and the person skilled in the art will recognize that the same principle applies to the other sensor element arrangements as depicted in FIGS. 2*b* to 2*g*.

In FIG. 2*h* the target 250 is located above a plane in which the three sensor elements 120, 130, 140 are arranged. The target 250 is able of moving within this plane.

In the here shown embodiment example, sensor element 140 is the transmitting sensor element and sensor elements 120 and 130 are the receiving sensor elements.

The target 250 is configured to affect the magnetic flux coupling between the transmitting sensor element 140 and the receiving sensor elements 120 and 130. Thereby, the first magnetic field emanated from the transmitting sensor element 140 causes eddy currents to flow within the target 250. The shape or form of the target 250 is thereby chosen as such, that the eddy currents flow in a predefined direction within the target 250. This causes the eddy currents to produce at least one directional magnetic field, which affects the first magnetic field emanated by the transmitting sensor element 140. In detail, it deforms the course of the magnetic field lines of the emanated first magnetic field. Hence, also the magnetic flux is affected. This results in a second magnetic field, which is a superposition of the first magnetic field and the magnetic field produced by the target. It can also be said the transmitting sensor element 140 inductively couples via the target to the receiving sensor elements 120 and 130. Magnetic field lines of this coupling are roughly depicted by the dotted lines 230, 235 between the transmitting sensor element 140 and the respective receiving sensor elements 120, 130. In this case, the magnetic field lines, extend from the transmitting sensor element 140 to the respective receiving sensor element 120, 130, wherein they pass through the target 250.

The at least two receiving sensor elements 120, 130 receive the affected first magnetic field, i.e. the second magnetic field, respectively encounter the affected magnetic flux, such that a current or voltage can be outputted by the two receiving sensor elements 120, 130. Hence, the at least two receiving sensor elements 120, 130 react to the transmitting sensor element 140, in such a way that the at least two receiving sensor elements 120, 130 are coupled to the at least one transmitting sensor element 140 via the target 250.

If the target 250 changes its position, the shape or form of the target 250 changes relatively to the magnetic field lines of the magnetic field generated by the transmitting sensor element 140, i.e. the magnetic field lines are differently affected, which in turn means the receiving sensor elements 120, 130 will encounter a different magnetic flux for different positions of the target 250.

For example, the shape or form of the target 250 may align the magnetic field lines along a particular direction, which is derivable from the shape or form of the target 250. If the transmitting sensor element 140 and at least one of the receiving sensor elements 120, 130 oppose each other along this particular direction, then the magnetic flux coupling between the transmitting sensor element 140 and the at least one of the receiving sensor elements 120, 130 is the highest. This means in turn, the respective receiving sensor element 120, 130 will measure a high induced current or voltage. The other respective receiving sensor element 120, 130, which does not oppose the transmitting sensor element 140 in the particular direction of the target 250 will encounter a lower magnetic flux. This means in turn, the respective receiving sensor element 120, 130 will measure a lower induced current or voltage. Since the induced currents or voltages measured by the receiving sensor elements 120, 103 are proportional to the amount of magnetic flux coupling, which is affected by the shape or form of the target 250, the respective currents or voltages allow a determination of the position of the target 250. In other words, due to the shape or form of the target 250, which is non-rotational invariant, different preferred directions are encountered at different positions of the target 250. Hence, at different positions of the target 250, different magnetic flux couplings between the transmitting sensor element 140 and the receiving sensor elements 120, 130 are encountered. This in turn means, different induced currents or voltages are encountered, from which the position of the target 250 can be determined. Thereby, the preferred direction in which the target 250 aligns the magnetic field lines is dependent upon its shape or form. It can also be said that it is dependent upon structures constituting the shape or form of the target 250. However, since the preferred direction of the shape or form of the target 250 is due to its invariance only predominant in one direction, an offset of the target 250 does not significantly change the relative currents or voltages measured by the receiving sensor elements 120 and 130, since their position with respect to each other is fixed and the preferred direction of the target 250 is not changed. This means the offset of the target 250 has the same relative effect on the magnetic flux coupling and as such on the outputted currents or voltages.

The target 250 may have different shapes or forms. The shape or form of the target 250 is non-rotational invariant in the sense that a rotation about an axis in an arbitrary angle changes the shape or form of the target 250 as it is seen from the location of one of the at least three sensor elements. However, it is clear to the person skilled in the art, that there may be particular angles for which a rotation about this angle may result in the same shape or form of the target 250. For example, it may be possible that a rotation of the target 250 about an angle of 360° may result in the same shape or form of the target 250 as seen by a respective sensor element, as for example depicted in FIG. 3b. In this case, the sensor elements are able to determine a position of the target 250 in a range of 360°. In another embodiment, a rotation of the target 250 about an angle of 180° or any multiple thereof may result in the same shape or form of the target 250, as for example depicted in FIGS. 3a and 3c. In this case, the sensor elements are able to determine a position of the target 250 in a range of 180°. In another embodiment, a rotation of the target 250 about an angle of 90° or any multiple thereof may result in the same shape or form of the target 250. In this case, the sensor elements are able to determine a position of the target 250 in a range of 90°.

Figure 3B:
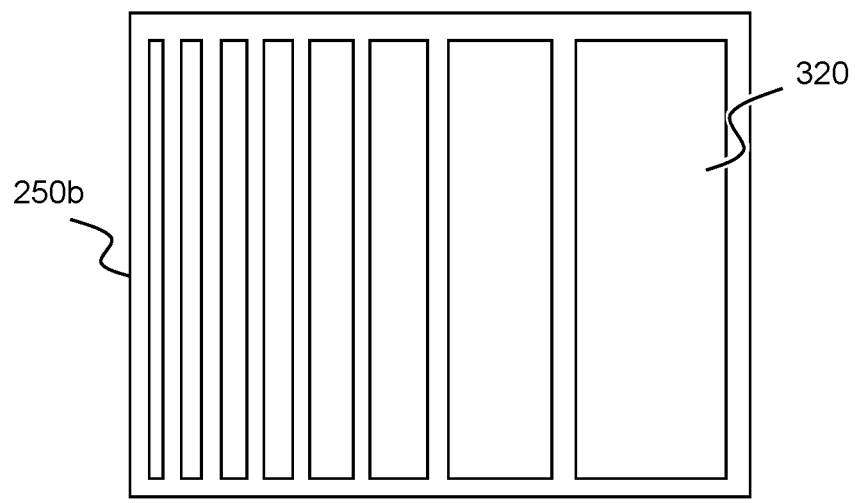
Figure 3C:
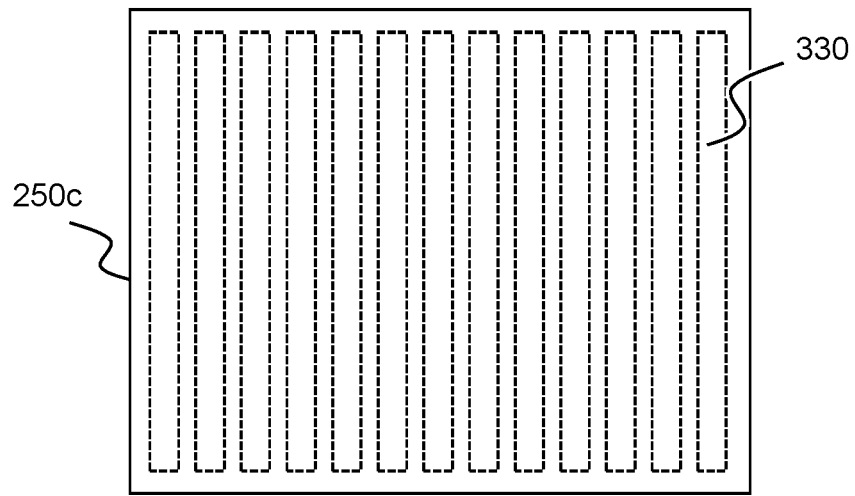

Different embodiment examples of the target 250 according to the invention are shown in FIGS. 3a, 3b, and 3c. Thereby, the different embodiment examples of the target 250 have different shapes or forms, which differently affect the magnetic flux coupling between the transmitting sensor element 140 and the two receiving sensor elements 120 and 130.

The shape or form of the target 250a shown in FIG. 3a comprises a number of slits 320, wherein the number of slits 320 may be any number of slits. A slit in the target 250a may extend from one side of the target 250a to the opposite side. For example, the slit may be a hole in the target, wherein said hole has a depth of the entire thickness of the target 250a. The slits are thereby arranged as such that they direct the flow of the eddy currents within the target 250a, such that the target 250a affects the emanated magnetic field in a preferred direction. Thereby, the slits 320 may have any shape or form that is suitable to direct the flow of the eddy currents. As shown in FIG. 3a, the slits 320 may be arranged in a particular pattern, which is depicted in FIG. 3a by a number of slits 320 having an equal width and length, which are arranged parallel to each other and extend across at least one dimension of the target 250a. As shown in FIG. 3a, the pattern may be represented by a ladder. With the pattern as depicted in FIG. 3a, a 180° ambiguity is encountered, since with a 180° rotation of the target 250a, the same pattern as with 0° is encountered. It can also be said the pattern given by the slits 320 is mirror-symmetrically in two directions. Hence, the target 250a comprises a two-directional mirror symmetry. However, the slits 320 are not limited to equal slits and furthermore their size may vary, for example in a particular manner, which is illustrated in FIG. 3b by ease of an increasing width of the slits 320, which is increasing in the direction of one dimension of the target 250b, forming a different pattern than the slits 320 as depicted in FIG. 3a. The respective target 250b has a one-axis symmetry, such that it has a 360° ambiguity, since with a 360° rotation of the target 250b, the same pattern as with 0° is encountered. It can also be said the pattern given by the slits 320 is mirror-symmetrically in one direction. Hence, the target 250b comprises a one-directional mirror symmetry. Furthermore, the size of the slits 320 may also vary in any other manner as depicted in FIG. 3b, for example the width of the slits 320 may first increase and then decrease with respect to the same direction. In another example, the width of the slits 320 may be distributed following a gradient across one dimension of the target 250b.

In another embodiment of the target 250d according to the invention, the slits 320 may be angled or tilted with respect to one another. This is shown in FIG. 5. For example, the angle of the tilt may increase from one slit 320 to another in one direction of the extend of the target 250d. In another embodiment of the target 250d according to the invention, the slits 320 may have a curved shape.

The target 250c as shown in FIG. 3c comprises recesses 330, which are illustrated by ease of dashed lines, instead of slits 320. A recess may extend from one side of the target 250c to a point somewhere inside of the body of the target 250c and does not extend to the opposite side of the target 250c. The recesses 330 may have any shape or form that is suitable to affect the magnetic flux coupling between the at least one transmitting sensor element 140 and the at least two receiving sensor elements 120, 130 and may be arranged in a similar manner as the aforementioned slits 320.

A person skilled in the art will also contemplate that targets with slits 320 and recesses 330 may be formed.

Although the outer shapes of the targets 250a, b, c depicted in FIGS. 3a, 3b, and 3c are illustrated as rectangles, the outer shape of the targets 250a, b, c according to the invention are not limited to rectangular shapes. The target 250 may also have a shape of a triangle, a square, a diamond, a trapeze, a circle, an ellipse, an oval, or any other shape, which is suitable.

The slits 320 and/or recesses 330 need to extend over an area of the target 250, which is larger than the area covered by the sensor elements 120, 130 and 140 on the sensor chip 100. The widths of the slits 320 and/or recesses 330 shall thereby be smaller than the effective area of one sensor element 120, 130, 140. For example, if the sensor elements 120, 130, 140 are coils, the effective area of the coils is given by their diameter or at least their spatial extend, i.e. the area covered. The widths of the slits 320 and/or recesses 330 is thereby be smaller than the respective effective area. However, the slits 320 and/or recesses may have a size of 0.3 mm by 0.9 mm.

The recesses 330 or slits 320 of the target 250 may also be adapted to change their size and/or their orientation. For example, the slits 320 may be adapted to change their size and/or their orientation adaptively dependent on the movement of the target 250, i.e. during operations.

In all of the examples shown in FIGS. 3a, 3b, and 3c, the target 250 may comprise a conductive material. For example, the target may be made at least partially from a conductive material, may comprise portions made at least partially from a conductive material. Further, the recesses 330 or slits 320 may be characterized as portions of the target 250.

FIGS. 4a, 4b, 4c, 4d, and 4e show the target 250a as depicted in FIG. 3a located above sensor elements 120, 130, 140 in different angular positions. Although the target 250a is chosen for illustrative purposes, it shall be mentioned that the inventive concept is also applicable to other targets and that only for simplification reasons the target 250a is chosen, but the following is not to be construed to be limited to the target 250a.

The position of the target 250a as shown in FIG. 4a may be referred to as a neutral position, a baseline position or a zero position. In the embodiment example shown in FIG. 4a, a first side of the rectangular target 250a may be aligned with the axis x. Perpendicular to the axis x, the target 250a comprises the slits 320. When the sensor element 140 produces a magnetic field, the magnetic field lines of the magnetic field are affected by the shape or form of the target 250a, in detail by the magnetic field generated by the eddy currents induced within the target 250a, wherein the eddy currents flow around the slits 320 in the here shown embodiment example. This may result in an alignment of the magnetic field lines of the emanated magnetic field with the orientation of the slits 320. Consequently, the sensor elements 120, 130 experience a similar magnetic flux, when the target 250a is in the neutral position. Hence, both sensor elements 120, 130 will output merely the same current or voltage, due to the fact that they will encounter the same magnetic flux. In FIG. 4a, this magnetic flux coupling is represented by the broad black arrows, which connect the transmitting sensor element 140 and the respective receiving sensor elements 120, 130. This magnetic flux coupling has to pass one slit of the target 250a for receiving sensor element 120 and receiving sensor element 130. This is highlighted by the shaded slit 320.

In the here shown embodiment example the magnetic flux coupling takes place in a direction, which has a component parallel to a particular direction, namely along the non slitted area, and a component perpendicular to said particular direction. The greater the perpendicular component is, the more will the magnetic flux, which is measured by the respective sensor element 120, 130, be reduced. In FIG. 4a, the perpendicular components are substantially equal for both of the receiving sensor elements 120, 130. The magnetic flux, which is encountered by the receiving sensor elements 120, 130, is therefore substantially the same. This in turn means, both receiving sensor elements 120, 130 will measure substantially the same induced current or voltage.

Figure 4B:
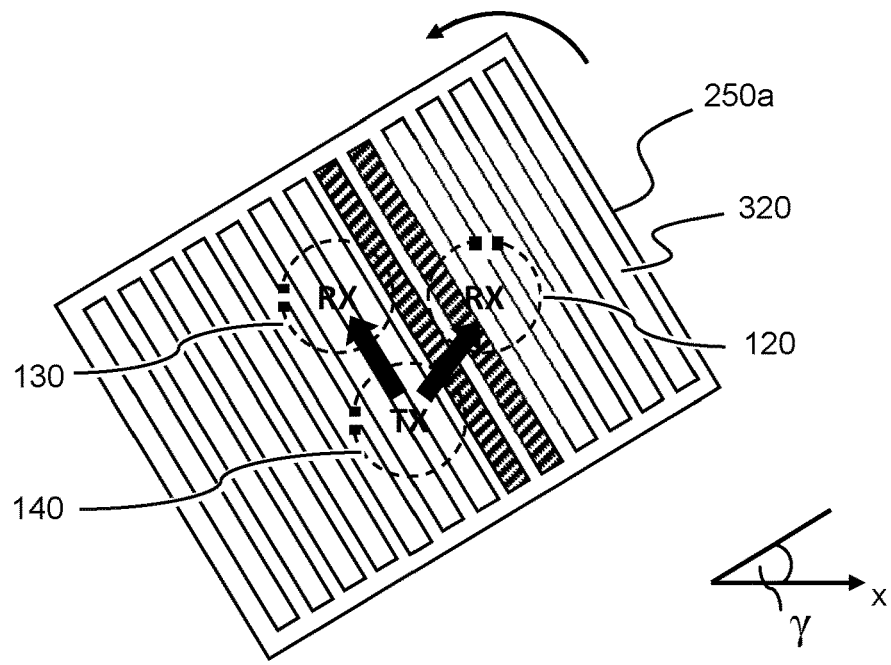

In FIG. 4b the same configuration as shown in FIG. 4a is shown, but the target 250a is rotated by an angle γ in the direction of the black curved arrow. In the here shown embodiment example, γ may be 30°. The resulting magnetic flux coupling, which is illustrated by the broad black arrows, is now different for the respective receiving sensor elements 120, 130. For receiving sensor element 130, the magnetic field lines, which are aligned with the direction of the slits 320, are also aligned with a connection line between the transmitting sensor element 140 and the receiving sensor element 130. As such, the direction of the magnetic flux coupling has a high component parallel to the preferred direction of the target 250a, while the perpendicular component is very low. The latter may be visualized by the fact that the broad black arrow, which illustrates the magnetic flux coupling, is aligned with the slits 320 for receiving sensor element 130. For the receiving sensor element 120, the direction of the magnetic flux, however, has a high component perpendicular to the preferred direction. This may be visualized by the broad black arrow passing two slits 320. This results in a difference in the magnetic flux, which is encountered by the respective receiving sensor elements 120, 130. This difference causes that the receiving sensor elements 120, 130 measure different induced currents or voltages. These different currents or voltages then allow to determine the position of the target 250a. In the here shown embodiment example, the different currents or voltages, allow to determine the angle of the target 250a with respect to the sensor elements 120, 130, 140.

Figure 4C:
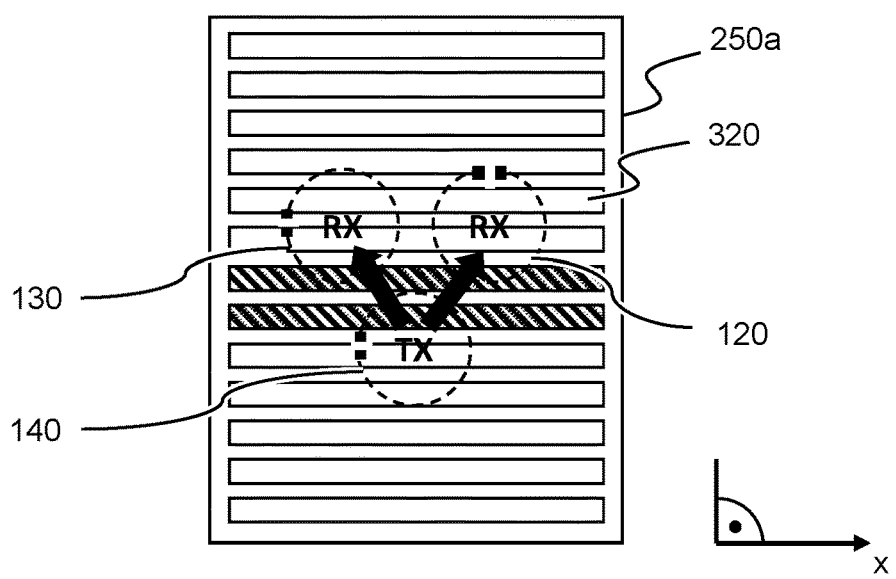

In FIG. 4c the target 250a is rotated by another 60°. In this case, both receiving sensor elements 120, 130 measure a reduced magnetic field of substantially the same magnitude. This is because the broad black arrows, which illustrate the magnetic flux coupling, have similar components parallel and perpendicular to the preferred direction. This in turn means that the measured induced currents or voltages of the receiving elements 120 and 130 are substantially the same again, but lower than the ones which are measured in the neutral position of the target 250a as depicted in FIG. 4a. The latter can be seen by the broad black arrows passing two slits 320 for each of the receiving sensor elements 120, 130, in FIG. 4c, whereas the broad black arrows as depicted in FIG. 4a pass one slit 320 for each of the receiving sensor elements 120, 130.

If only the ratios of the induced currents or voltages measured at the respective receiving elements 120, 130 are compared between the positions of the target 250a as depicted in FIG. 4a and FIG. 4c, a rotation of the target 250 of only about 90° can be arbitrarily determined. This is because comparing the ratios of the currents or voltages of the receiving elements 120 and 130 will result in the same value for the position of the target 250a as depicted in FIG. 4a and FIG. 4c, since the receiving sensor elements 120 and 130 will both measure merely the same induced current or voltage values for both positions. However, if also the magnitude of the induced current and voltage values are accounted for, then also a rotation of the target 250a of about 180° can be arbitrarily determined.

This is due to the fact that the absolute value of the induced current or voltage is reduced for the position of the target 250a as depicted in FIG. 4c than compared to FIG. 4a. For example, even if for the target 250a the ratio of the measured induced currents or voltages between the receiving sensor elements 120 and 130 is the same for the angle of 0° (FIG. 4a) and 90° (FIG. 4c), the absolute value is different, because the target 250a is non-rotational invariant with respect to a rotation of about 90°. Hence, by accounting also for the magnitude of the measured induced currents or voltages an angular position of the target between 0° and 180° can be determined.

Figure 4D:
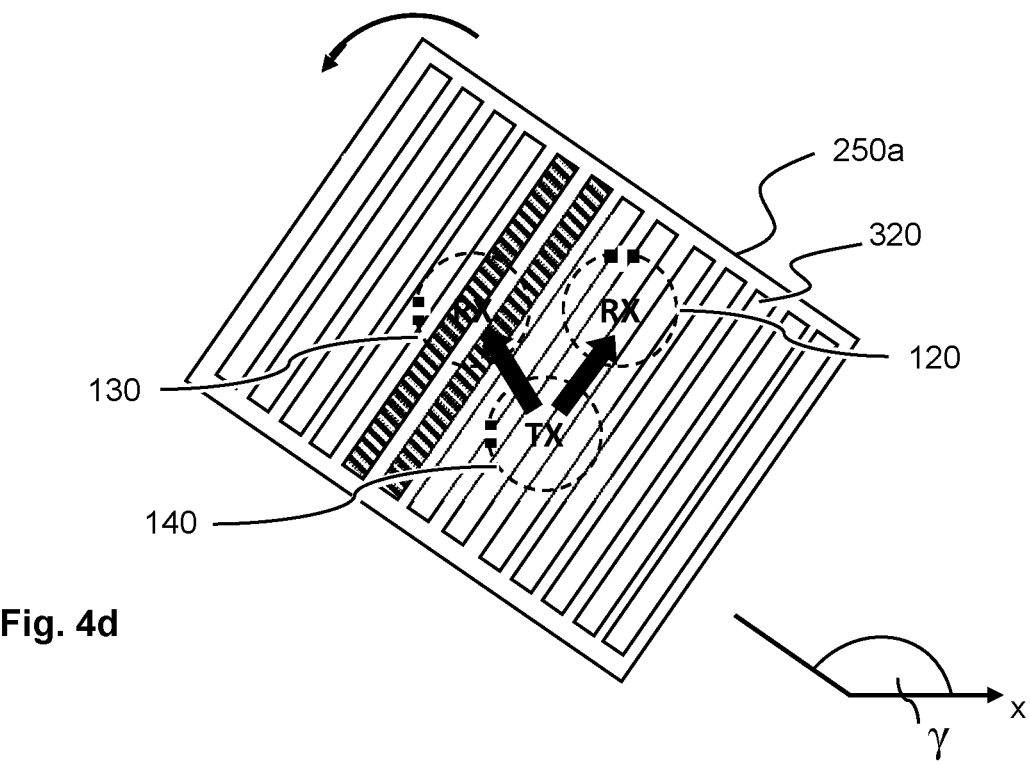

In FIG. 4d the target 250a is rotated by another 60°. The resulting magnetic flux coupling, which is illustrated by the broad black arrows, is again different for the respective receiving sensor elements 120, 130. Here the magnetic flux coupling between the transmitting sensor element 140 and the receiving sensor element 120 has a high component parallel to the preferred direction and a low perpendicular component, whereas the situation is vice versa for receiving sensor element 130. This difference causes that the receiving sensor elements 120, 130 measure different induced currents or voltages.

Figure 4E:
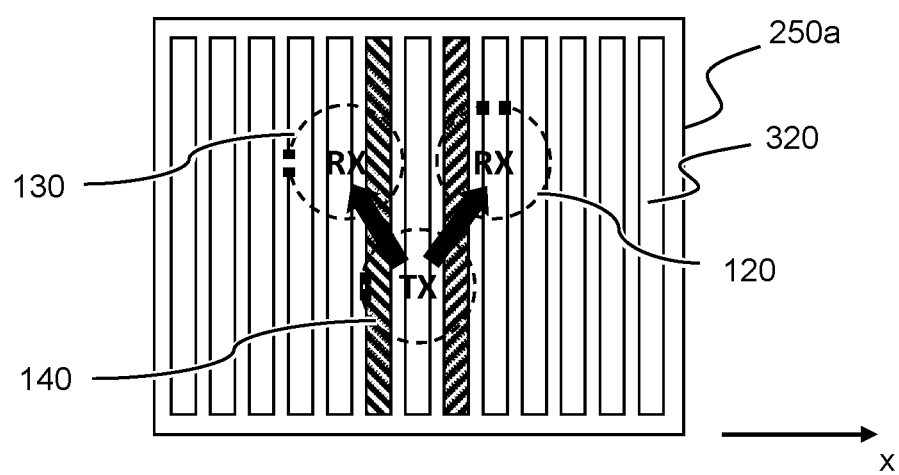

In FIG. 4e the target 250a is rotated by another 30°. It is clear to the person skilled in the art that the receiving sensor elements 120 and 130 measure substantially the same induced current or voltage, since the target 250a has been rotated by 180° and has as such substantially the same orientation and preferred direction of affecting the emanated magnetic field as in FIG. 4a. However, it may also be clear to the person skilled in the art that deviations and imperfections caused by the manufacturing process of the target 250 may prevent the target 250 from being absolutely symmetric with respect to a rotation of 180°.

If the operational mode of the producing and receiving sensor elements 120, 130, 140 is changed during the rotation, for example as depicted in FIGS. 2a, b, c, then for every angle between the neutral position and 360° can be determined. Furthermore, also by using different shapes or forms of the target 250, as shown in FIGS. 3b and 3c even without operational mode changing the range of the arbitrary position determination can be enhanced. For example, whereas the shape or form of the target 250a as depicted in FIG. 3a is rotational invariant with respect to a rotation of about 180° and every multiple thereof and therefore has an 180° ambiguity, the shape or form of the target 250b as depicted in FIG. 3b is rotational invariant with respect to a rotation of about 360° and every multiple thereof and therefore has an 360° ambiguity. Therefore, the target 250b as depicted in FIG. 3b may allow for sensing the position of the target 250b in the range between the neutral position and 360° without operational mode change.

Figure 5B:
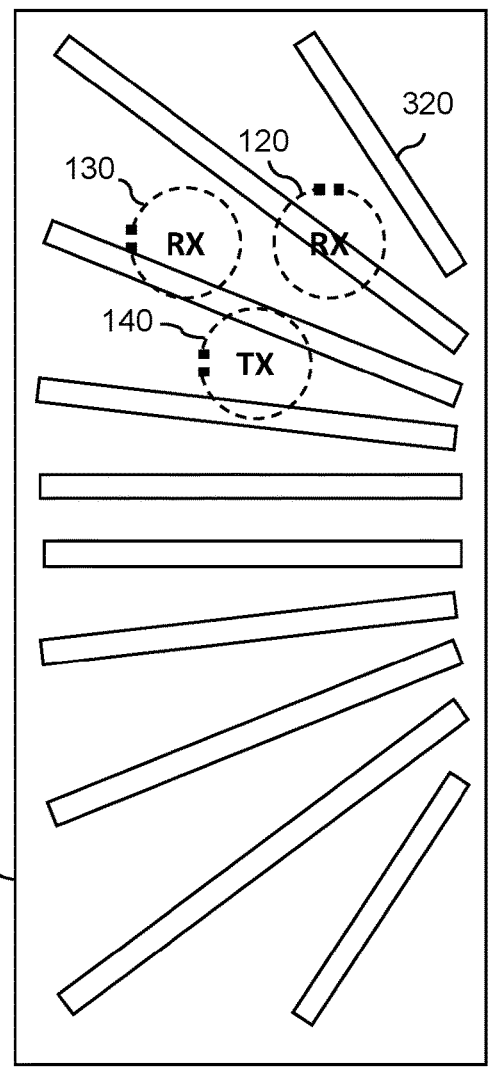

FIGS. 5a and 5b show a target 250d arranged over sensor elements 120, 130, 140 for a linear position sensing.

In FIG. 5a, the target 250d is located in a first position, in which the sensor elements 120, 130, 140 are in the middle of the target 250d. This first position may also be referred to as a neutral position, a baseline position, or a zero position. However, in another embodiment of the invention, another position, for example a position at one of the end areas of the target 250d, may represent such a neutral, baseline, or zero position. However, in yet another embodiment, any other position in between the center and the one or two end areas of the target 250d may represent such a neutral, baseline or zero position.

In FIG. 5b, the target 250d is moved in a linear manner relatively to the sensor elements 120, 130, 140 in direction of the arrow into a second position.

Due to the fact that the slits 320 of the target 250d depicted in FIGS. 5a and 5b are tilted or angled with respect to one another, the linear movement of the target 250d relatively to the sensor elements 120, 130, 140 causes a change in the magnetic flux coupling of the transmitting sensor element 140 and the receiving sensor elements 120, 130. Because the slits 320 are angled with respect to one another, said linear movement causes the target 250d to affect the magnetic flux coupling similar to a rotational movement as described with respect to FIGS. 4a, 4b, 4c, 4d, and 4e. Therefore, it may be said that by using a target 250d with tilted or angled slits 320 for sensing a linear position, a linear motion of the target 250d relatively to the sensor elements 120, 130, 140 imitates an angular motion, by ease of the tilted or angled slits 320. Thereby, it can be said that each slit 320 defines locally another preferred direction of affecting the emanated magnetic field. Hence, by moving the target 250d linearly over sensor elements 120, 130, and 140 for each position a new preferred direction is encountered, such that the position of the target 250d can be determined.

In FIG. 5a the magnetic flux coupling between the transmitting sensor element 140 and the receiving sensor elements 120 and 130 is merely equal, since the magnetic flux coupling for both receiving sensor elements 120 and 130 have the same parallel and perpendicular component as compared to the localized preferred direction. Hence, both receiving sensor elements 120 and 130 will merely measure the same induced currents or voltages.

In FIG. 5b the transmitting sensor element 140 and the receiving sensor element 130 lie within a localized preferred direction. Hence, the magnetic flux coupling between these sensor elements is high. Contrary to this, the connecting line between the transmitting sensor element 140 and the receiving sensor element 120 is substantially perpendicular to the localized preferred direction. Hence, the magnetic flux coupling of the transmitting sensor element 140 and the respective receiving sensor element 120 is reduced. Hence, the receiving sensor element 130 will measure a higher induced current or voltage than the receiving sensor element 120.

FIG. 6 shows a plan view of the sensor chip 100, which may be the sensor chip 100 depicted in FIG. 1, and the target 250a according to the embodiment example of FIG. 3a. As illustrated by ease of the curved arrow shown in FIG. 6, the target 250a is configured to rotate with respect to the sensor elements of the sensor chip 100, which determine the angular position of the target 250a.

FIG. 7 shows a plan view of the sensor chip 100 and the target 250a of FIG. 6, wherein the rotation axis of the target 250a is offset to the rotational axis as shown in FIG. 6. The offset is a translational offset in x- and y-direction.

The offset of the target 250a does not have a substantial effect on the operation of the sensor chip 100 according to the invention. As has been described herein, this is due to the fact that the magnetic flux coupling of the respective sensor elements is measured by the sensor elements instead of a magnetic field, which may be generated by the target 250a as known in the art. According to the invention, the shape or form of the target 250a affects the magnetic field lines and therefore affects the magnetic flux, which then has an effect on the magnetic flux coupling of the respective sensor elements. This magnetic flux coupling is only dependent on the shape or form of the target 250a, which may for example be characterized by recesses and/or slits. Because these recesses or slits change the magnetic flux in a particular direction, which is defined by the shape or form of the recesses and/or slits, the arrangement of the coils of the sensor chip 100 is invariant to offsets. As evident from a comparison of FIGS. 6 and 7, the pattern of the target 250a causes in the non-offset situation still the same magnetic flux coupling between the transmitting sensor element and the receiving sensor elements as in the offset situation, because of its non-rotational invariant shape or form, respectively the non-rotational invariant pattern of slits and/or recesses. Thereby, the magnetic flux coupling is indicated by the thick black arrows, as already explained in context of FIGS. 4a-e. Even if the target 250a is offset, the preferred direction remains unchanged, only the absolute values of the induced currents or voltages may be influences by the offset, but not the relative values, such that the offset does not degrade the determination capability.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims.

The invention claimed is:

1. An apparatus for sensing a position of a target, the apparatus comprising:
   a semiconductor chip that includes at least three sensor elements arranged in one or more layers of a substrate of the semiconductor chip;
   wherein at least one sensor element of the at least three sensor elements generates a first magnetic field,
   wherein at least two sensor elements of the at least three sensor elements receive a second magnetic field associated with the first magnetic field,
   wherein the at least two sensor elements of the at least three sensor elements form at least one sensor element pair and provide a signal indicative of the position of the target, wherein the at least one sensor element of the at least three sensor elements generating the first magnetic field at least partially and spatially overlaps with the at least two sensor elements of the at least three sensor elements such that an at least partial overlap exists between the at least one sensor element of the at least three sensor elements generating the first magnetic field and the at least two sensor elements of the at least three sensor elements, and wherein the at least partial overlap is configured so that the at least two sensor elements of the at least three sensor elements encounter counteracting magnetic flux from the generated first magnetic field.

2. The apparatus according to claim 1, wherein the number of sensor elements generating the first magnetic field is lower than the number of sensor elements receiving the second magnetic field.

3. The apparatus according to claim 1, wherein the number of sensor elements generating the first magnetic field is higher than the number of sensor elements receiving the second magnetic field.

4. The apparatus according to claim 1, wherein the at least two sensor elements of the at least three sensor elements forming the at least one sensor element pair are operated in a common mode or differential mode.

5. The apparatus according to claim 1, wherein the second magnetic field is the first magnetic field affected by the target.

6. The apparatus according to claim 1, wherein the at least one sensor element of the at least three sensor elements generating the first magnetic field is configured to generate an alternating first magnetic field.

7. The apparatus according to claim 1, wherein the at least one sensor element of the at least three sensor elements generating the first magnetic field is configured to generate a rotational invariant first magnetic field.

8. The apparatus according to claim 1, wherein the at least one sensor element of the at least three sensor elements generating the first magnetic field spatially surrounds the at least two sensor elements of the at least three sensor elements.

9. The apparatus according to claim 1, wherein the at least one sensor element of the at least three sensor elements generating the first magnetic field is located at a center of the at least two sensor elements of the at least three sensor elements.

10. The apparatus according to claim 1, wherein the at least three sensor elements are coils.

11. The apparatus according to claim 1, wherein the semiconductor chip including the at least three sensor elements is implemented together with means for driving the at least one sensor element generating the first magnetic field and/or means for processing outputted signals from the at least two sensor elements of the at least three sensor elements in one die or a molded package.

12. The apparatus according to claim 1, wherein the apparatus is configured for offset invariant sensing of the position of the target.

13. The apparatus according to claim 1, wherein the at least two sensor elements of the at least three sensor elements are symmetrically arranged with respect to the at least one sensor element of the at least three sensor elements generating the first magnetic field.

14. The apparatus according to claim 1, wherein the at least two sensor elements of the at least three sensor elements are arranged in a first plane of a first layer of the semiconductor chip and the at least one sensor element of the at least three sensor elements generating the first magnetic field is arranged in a second plane of a second layer of the semiconductor chip, the first plane of the first layer of the semiconductor being different than and parallel to the second plane of the second layer of the semiconductor chip.

15. An apparatus for sensing a position of a target, in particular for offset invariant sensing of the position of the target, the apparatus comprising:

at least three sensor elements;

wherein at least one sensor element of the at least three sensor elements generates a first magnetic field, wherein at least two sensor elements of the at least three sensor elements receive a second magnetic field associated with the first magnetic field and wherein the at least two sensor elements of the at least three sensor elements form at least one sensor element pair and provide a signal indicative of the position of the target, wherein the at least one sensor element of the at least three sensor elements generating the first magnetic field at least partially and spatially overlaps with the at least two sensor elements of the at least three sensor elements such that an at least partial overlap exists between the at least one sensor element of the at least three sensor elements generating the first magnetic field and the at least two sensor elements of the at least three sensor elements, and wherein the at least partial overlap is configured so that the at least two sensor elements of the at least three sensor elements encounter counteracting magnetic flux from the generated first magnetic field.

16. A method for sensing the position of a target, the method comprising:

providing a semiconductor chip that includes at least three sensor elements arranged in one or more layers of a substrate of the semiconductor chip;

generating a first magnetic field by at least one sensor element of at least three sensor elements;

receiving a second magnetic field by at least two sensor elements of the at least three sensor elements, wherein the second magnetic field is associated with the first magnetic field, and wherein the at least one sensor element of the at least three sensor elements generating the first magnetic field at least partially and spatially overlaps with the at least two sensor elements of the at least three sensor elements such that an at least partial overlap exists between the at least one sensor element of the at least three sensor elements generating the first magnetic field and the at least two sensor elements of the at least three sensor elements, and due to the at least partial overlap, the at least two sensor elements of the at least three sensor elements encounter counteracting magnetic flux from the generated first magnetic field; and calculating a signal from signals outputted by the at least two sensor elements of the at least three sensor elements receiving the second magnetic field, wherein the signal is indicative of the position of the target.

17. The method according to claim 16, further comprising:

calculating a sum signal from the signals outputted by the at least two sensor elements of the at least three sensor elements receiving the second magnetic field; and determine the position based at least partially on the calculated sum signal and/or differential signal.

18. The method according to claim 16, further comprising:
  calculating a differential signal from the signals outputted by the at least two sensor elements of the at least three sensor elements receiving the second magnetic field; and
  determine the position based at least partially on the calculated sum signal and/or differential signal.

\* \* \* \* \*